United States Patent [19]
Gauthier et al.

[11] Patent Number: 5,079,653
[45] Date of Patent: Jan. 7, 1992

[54] INFORMATION STORAGE DISC TRANSDUCER POSITION CONTROL SYSTEM USING LAST STEP DAMPING

[75] Inventors: Raymond G. Gauthier, Santa Cruz County; Brian P. Tremaine, Santa Clara County; James N. Krause, Santa Clara County; Litko R. Chan, Santa Clara County, all of Calif.

[73] Assignee: Seagate Technology, Inc., Scotts Valley, Calif.

[21] Appl. No.: 226,150

[22] Filed: Jul. 29, 1988

[51] Int. Cl.$^5$ .............................................. G11B 5/55
[52] U.S. Cl. ................................. 360/78.13; 318/685; 318/696
[58] Field of Search ............... 360/77.03, 78.08, 78.13; 318/685, 696

[56] References Cited
U.S. PATENT DOCUMENTS 4,282,471 8/1981 Budniak et al. ...................... 318/685
4,422,113 12/1983 Mabon .............................. 360/78.13

Primary Examiner—Vincent P. Canney
Assistant Examiner—Steven R. Garland
Attorney, Agent, or Firm—Flehr, Hohbach, Test, Albritton & Herbert

[57] ABSTRACT

The output of the ring detector is used to change or control the timing of specially generated torque damping pulses which are fed to the stepper motor at the end of a SEEK step sequence. These torque damping pulses are step pulses, the timing, amplitude and/or duration of which applies either a positive or negative torque to the stepper motor relative to the target track based on the "energy" that has to be dissipated to settle the read/-write head over the desired track. The energy is measured indirectly by monitoring the back emf voltage of an open winding or unenergized phase of the motor, and developing an indication of how fast the read/write head is going through the desired track center or target track point. By bringing an additional signal out of the ring detector, the direction in which the read/write head has crossed the track can also be defined. Based on how fast the read/write head is going and in which direction, the microprocessor accesses a look-up table for selecting the timing, amplitude and/or duration of the damping pulse.

16 Claims, 23 Drawing Sheets

INFORMATION STORAGE DISC TRANSDUCER POSITION CONTROL SYSTEM USING LAST STEP DAMPING

FIELD OF THE INVENTION

This invention relates generally to a method for controlling the position of a read/write head with respect to a rotating information storage disc, and more particularly to a method of reducing the ring-out time of a stepping motor used to control the position of a read/write head with respect to a rotating storage disc.

BACKGROUND OF THE INVENTION

It is generally desirable to increase as much as practical the amount of data which can be stored on an information storage disc. Data is generally stored on a disc on concentric circular tracks. Obviously, it is desirable to fit as many tracks as possible on a disc surface, which means that the tracks should be as narrow as practical and as close together as practical. However, it is also necessary to position a read/write head over the middle of any desired track and to keep it there during rotation of the disc while the data is written into the track or read from the track. As the tracks become ever smaller in width and are spaced closer and closer together, it becomes increasingly difficult to correctly position the read/write head. It is this ability to reliably position a read/write head over the center of a desired track while the disc is rotating, which limits the practical density of the recording discs.

With magnetic storage discs, typically an open loop positioning system with no feedback control is used to coarse position either one or an array of read/write transducers over a desired track. With flexible magnetic storage discs, this is typically the only positioning system for the read/write head. With hard magnetic storage discs, coarse positioning is generally followed by fine positioning using a positioning system with feedback control to precisely position the read/write head over the center of the desired track. The fine positioning system generally locks onto and tracks a magnetic pattern of some kind. Most of these magnetic servo schemes use a significant portion of the recording surface for a magnetic servo pattern. This obviously reduces the amount of recording surface available for recording data.

An objective of this invention is to reduce the access time to a given target track without the use of a closed loop servo system. More particularly, an objective is to provide a disc drive with low access times without sacrificing disc surface space to servo data storage.

More particularly, it is an objective herein to provide a simply implemented system which can reduce the time necessary to finely position a read/write head over the center of the target track. This reduction in access time is very important in reducing the time necessary to move the read/write head from one track to another over a disc surface.

In the past, it has been identified as being highly desirable in fine positioning a read/write head to reduce the settling time; that is, the time necessary to slow down and then finally stop a read/write head in its movement from one track to another. In order to achieve a reduction from about 65 milliseconds access time to below 40 milliseconds, open loop control methods were initially used wherein a minimum ring-out time was achieved by correctly timing the step input command pulses to a stepper motor. This open loop approach, however, has limited effectiveness because motor parameters will vary due to manufacturing tolerances. Therefore, with an invariant algorithm, the step response will no longer have minimum ring-out for every motor. The principles of closed loop methods to minimize the single step response ring-out time, that is, the time necessary to finally settle the read/write head over the target track, have been described in the literature, but they require an external sensor or an extensive amount of electronics to decode winding voltages and produce a feedback signal.

Therefore, it is an objective of this invention to use and incorporate a simple voltage feedback method that uses the fact that the motor step size is small compared to one electrical cycle of the back emf of the motor.

SUMMARY OF THE INVENTION

In accordance with this invention, apparatus and method is described for using the output of the ring detector in controlling the settling of a read/write head over a desired track to significantly reduce the settling time. Prior art systems allow the read/write head positioning system ring out naturally and then send the SEEK COMPLETE signal to the controlling microprocessor when this process is complete. In this invention, the output of the ring detector is used to change or control the timing of specially generated torque damping pulses which are fed to the stepper motor at the end of a SEEK step sequence. These torque damping pulses are step pulses, the timing and/or duration of which applies either a positive or negative torque to the stepper motor relative to the target track based on the "energy" that has to be dissipated to settle the read/write head over the desired track. The energy is measured indirectly by monitoring the back emf voltage of an open winding or unenergized phase of the motor, and developing an indication of how fast the read/write head is going through the desired track zero or target track point.

In a preferred embodiment, this speed is represented by the ring pulse time output from the ring detector measured as the step motor crosses the zero velocity axis. By bringing an additional signal out of the ring detector, the direction in which the read/write head has crossed the track can also be defined. Based on how fast the read/write head is going and in which direction, the microprocessor accesses a lookup table for selecting the timing of the damping pulse.

More specifically, the lookup table includes the timing of damping pulses which can be applied to a selected phase of the motor to minimize the ring-out for various ring pulse time initial conditions. Given various initial velocities, the step time T1, which is the time from the zero velocity crossing to the beginning of the torque damping pulse (as commanded by a first damp step pulse command), can be plotted vs. the ring pulse time, i.e., energy. A similar plot can be made for the step time T2 which is the time from the zero velocity crossing to the end of the torque damping pulse (as commanded by a second damp step pulse command). From this data, a polynomial using least square's method is fitted through the data points, and an energy function is developed comprising ring pulse time (a measure of how rapidly the step motor crosses the zero velocity axis between predefined positive and negative thresholds relative to the zero velocity point) vs. the torque damping pulse command times T1 and T2; that is, the time to the application of and duration of the torque damping pulse. This pulse deenergizes a selected phase of the motor to minimize the ring-out time given the initial energy function calculation and the knowledge of which motor phases are energized to settle on a particular track. Based on this information, the microprocessor can control the deenergization of a selected phase of the motor in order to rapidly settle the read/write head over the desired track and significantly reduce the settling time of the device.

It should be noted that while this application discloses the method and apparatus in conjunction with a 10-phase motor driven in a star drive configuration, the results can be applied to a motor with any number of phases and other drive configurations.

In the preferred embodiment, one of the phases normally deenergized in positioning the motor at a target track is briefly energized to damp the motor; alternatively, a normally energized phase could be de-energized for the duration of the torque damping pulse to achieve the same goal.

It should further be noted that this invention is especially useful to control the timing of the last step pulse commands of a long seek to reduce the settling time. These step pulse commands are added to the end of a normally generated sequence of step pulse signals to rapidly settle the motor over the track.

References to energy should be understood to mean the width of the ring detector pulse as the read/write head passes through zero velocity, i.e., at the point of maximum displacement from the target track, as this pulse width is directly related to the energy of the transducer relative to the target track.

In describing this invention, the following conventions will be used: "motor detent position" shall mean a position of stable equilibrium for the motor; "positive torque damping pulse" shall mean a pulse which creates additional motor torque in the original track seek direction; "negative torque damping pulse" shall mean a pulse which reduces motor torque in the original track seek direction; "ringing" is a measure of the energy the transducer has as it crosses the target track at the end of a seek.

The features and advantages of this invention will be better understood with reference to the following drawings and the accompanying detailed description of a preferred embodiment of the invention.

DETAILED DESCRIPTION OF A PREFERRED EMBODIMENT

Figure 1:
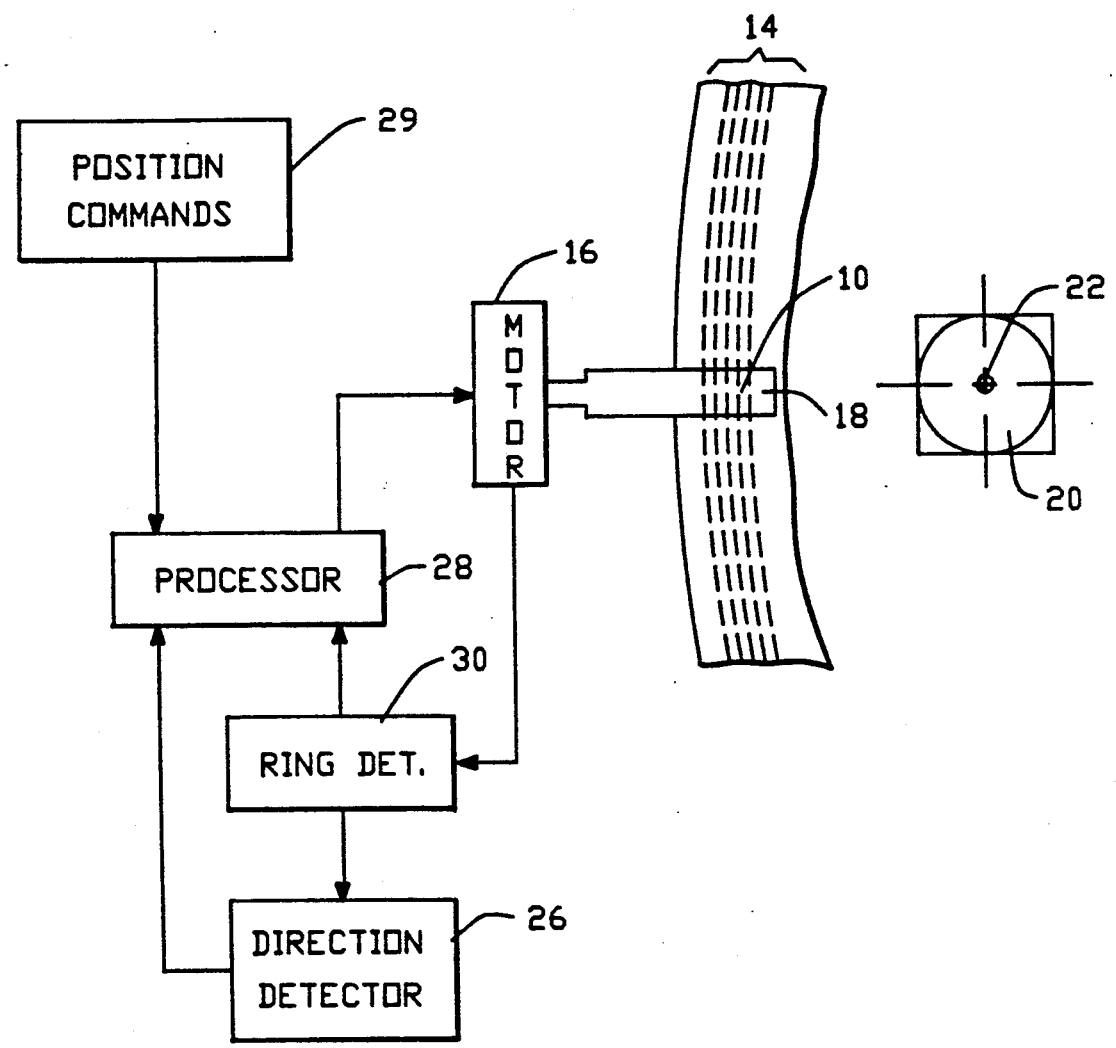
FIG. 1 is a block diagram of the essential elements of the system.

Referring to FIG. 1, one or more read/write heads 10 positionable relative to a storage medium such as a disc 12 are illustrated. The disc 12 includes a plurality of concentric tric tracks 14; the disc is a magnetizable medium such that data may be recorded and retrieved along the lines of the tracks 14 by means of the read/write head 10 in a conventional manner. Positioning means comprising the motor 16 is energized to move the read/write head 10 to preselected recording positions or tracks 14 over the disc 12. The positioning means comprises a stepper motor 16 (multiple phases of which appear in FIG. 2) that may be selectively energized to position the read/write head 10 over any one of the tracks 14. The head is supported on an arm 18 adjacent the surface of the disc where the read/write head 10 flies on a thin film of air when the disc 12 is rotated. Drive means 20 located concentric with central axis 22 of the disc 12 are provided to create relative movement between the disc 12 and the read/write head 10, thereby enabling the transfer of data between the magnetic storage medium and the heads in a conventional manner. The drive means 20 in this case comprises a direct drive motor that spins the disc 12 about the central axis 22.

To briefly review the other major elements in FIG. 1, when a read/write head 10 is being moved in a seek mode from one track to a desired target track, the number of step pulses that have been fed to the motor is monitored so that the processor 28 may continuously calculate the position of the moving read/write head 10 relative to the target track. This target track is defined by the position command 29 from memory 30. When the target track is passed by the read/write head 10, the output of the ring detector 31 is monitored to determine how much ringing exists. When the target track is reached, a predetermined algorithm is used to finally position the read/write head 10 relative to the target track. The present invention uses the ring detector output in a novel manner to reduce the settling time and thereby reduce the access time, that is, the time needed to move the read/write head from an initial track to the target track on the surface of the disc.

The specific positioning of read/write head 10 relative to a selected track is accomplished by selective energization of the differing phases of the exemplary 10-phase stepper motor. This may be better understood by referring to FIG. 2. In this explanation, the motor has ten poles, each of which is wound with a coil. The coils of opposing poles (180° apart) are wound together in series, as illustrated in FIG. 3 by the coils 30A–30E.

Five external motor coils are brought out separately as ten leads, A+, A−; B+, B−; C+, C−; D+, D−; and E+, E−. Alternatively, all leads of the same polarity may be tied together internally and brought out as a single center tap lead along with the five remaining motor leads. The preferred adaptive damping scheme is compatible with either method of accessing the motor leads.

Figure 2:
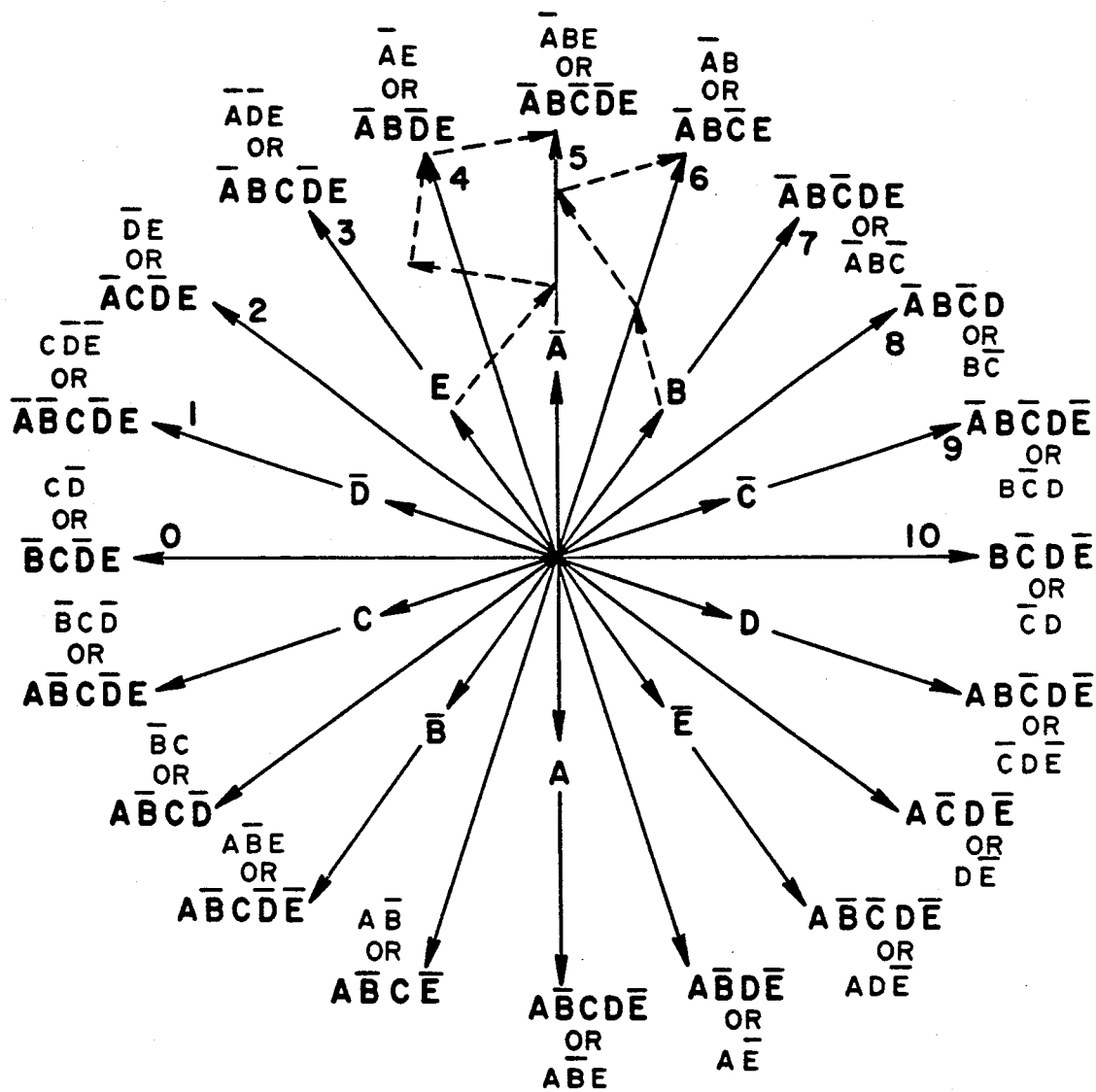
FIG. 2 schematically illustrates 20 motor detent positions that can be reached in a given electrical cycle by energizing, selected phases of the motor.
Figure 3:
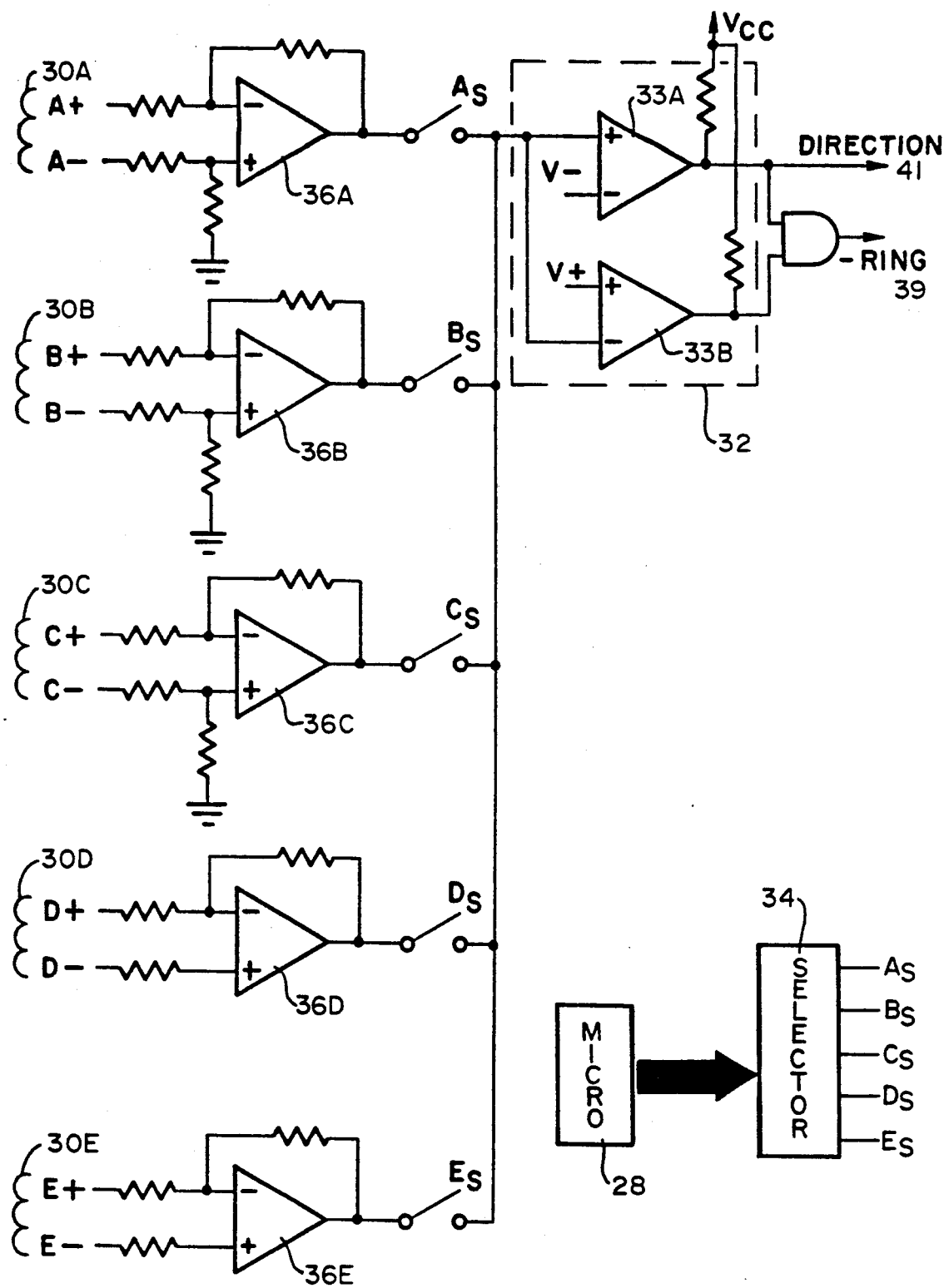
FIG. 3 illustrates a preferred implementation of this invention showing the connections between the ring detector and the motor phases, and also illustrating the necessary connections to develop signals illustrating both pulse width and the direction in which the read/write head crosses the track.

Referring again to the vector diagram of FIG. 2, there are 20 motor detent positions per electrical cycle. The positions with two or four phases on are even read/write track centers, while the five or three phase positions are odd read/write track centers. It should be noted for purposes of understanding the operability of this invention that odd numbered on-track centers may be held with either five phases on or with three phases on. For example, track 5, represented by the number "5" appearing at the arrow end of one vector, can be held with the sequence A B $\overline{C}$ $\overline{D}$ E or with the sequence $\overline{A}$, B, E. Track 4 can be held with sequence $\overline{A}$ B $\overline{D}$ E or $\overline{AE}$.

When the motor phases are active, the torque generated by the motor varies sinusoidally with rotor position. The point of stable motor detent is where the torque is zero and the torque position curve is on a negative tangent. The detent position is then a point of zero torque, and minimum back emf for the combined active windings. For example refer to the vector diagram for track 4, wherein the active windings are $\overline{A}$, B, $\overline{D}$, E while the C winding is off. Note that the combined active windings are at 90° to the inactive winding C. Thus, the back emf generated by winding C is at its peak at track 4 (as well as at track 14). Likewise, for track 5 if this track is being held with three phases on, the active phases are $\overline{A}$, B, E, and the off phases $\overline{C}$ and $\overline{D}$ are 72° from the combined active phases. Hence, the back emf generated by winding $\overline{C}$ or $\overline{D}$ is near its peak at track 5 (as well as at track 15). By following this pattern, it can be seen that every even track detent location has an off winding which generates maximum back emf, and every odd track location, in three-phase-on mode, has an off winding which generates near maximum back emf. This back emf can be read by a ring detector to develop a signal indicating system energy and thereby transducer velocity as a target track position is crossed.

Figure 4:
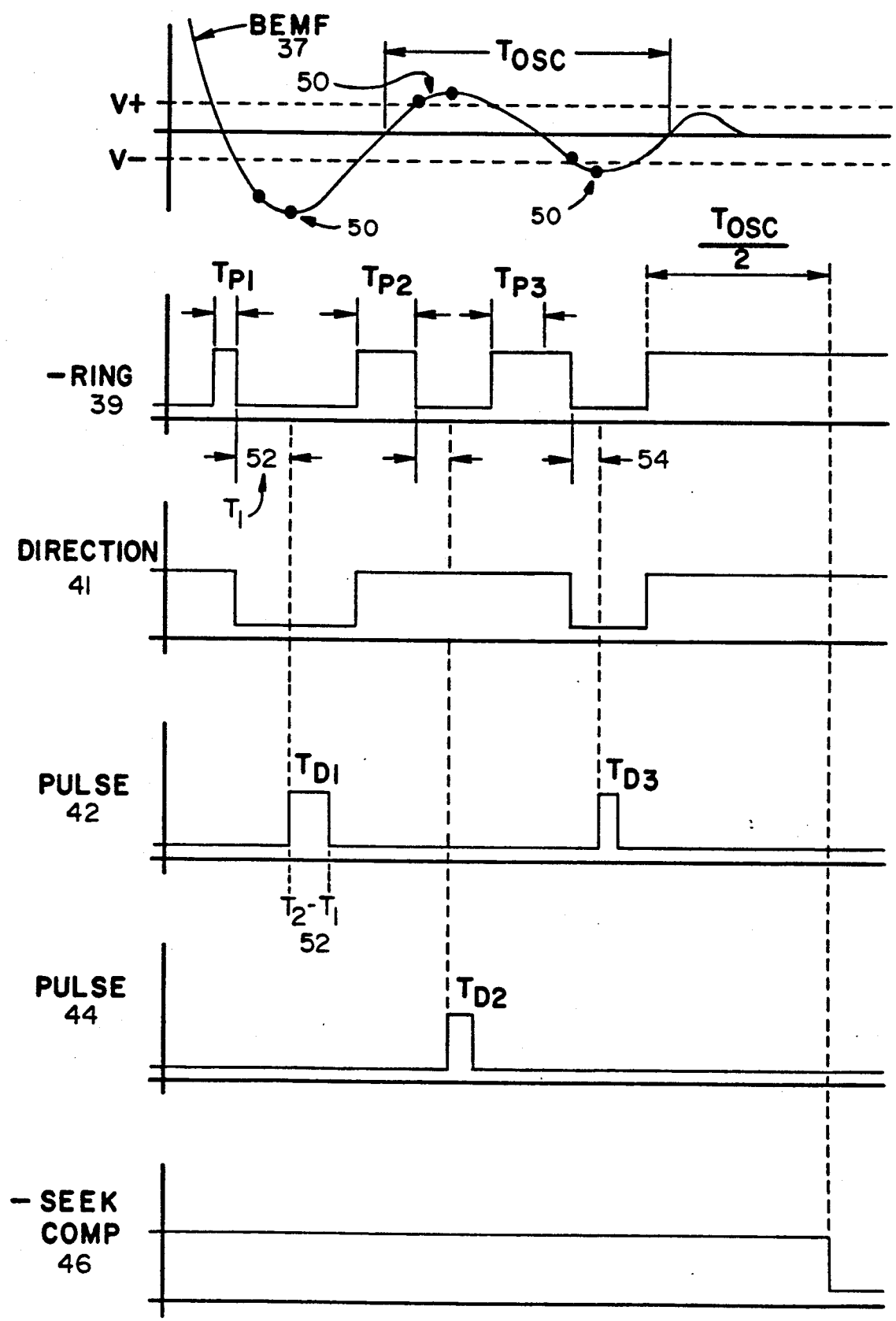
FIG. 4 illustrates the signals which are developed by the ring detector and the controlling microprocessor by tapping into the unenergized phase of the motor.

In known stepper motor positioning systems not using any feedback, the settling time must be fixed as the maximum worst case expected time, resulting in an inordinately long time to settle at the end of any seek. The objective of this invention is to modify this system to minimize seek settling time by using the output of a modified ring detector, the ring detector indicating both the velocity at which a target track is crossed by the seeking read/write head and the direction. The timing diagram of FIG. 4 shows the signals -RING 39 and DIRECTION 41 that comprise the outputs of this ring detector 32.

Referring to the schematic diagram of FIG. 3, a ring detector 32 is shown selectively connected to the output of any of the coils in response to commands through a selector 34 from the microprocessor 28. The ring detector 32 takes the back emf signal from a selected, i.e., non-energized, coil of the stepper motor and applies it to an input of each of a pair of operational amplifiers 33A, B. The other input receives a threshold level bias voltage +V, −V, set to represent a specified level of off-track, e.g., ±5%. The ring detector, which has a binary output, will switch output levels when the back emf signal is between the voltage levels +V, −V and passes sufficiently rapidly from one threshold to the other. The assumption being made is that the speed with which the stepper motor switches from a positive to negative velocity (relative to the target track) directly represents the speed at which the transducer passed over the target track and therefore the amount of mistracking. To achieve this goal, a separate amplifier 36 is provided for each winding 30A-E, connected across the two outputs of the series connected coils of the motor. The output of each amplifier 36A-E is multiplexed to the ring detector 32 (which functions as a window comparator) by microprocessor 28 via selector 34. The microprocessor 28 keeps account of which track the stepper is arriving at as illustrated in FIG. 2, and selects the amplifier 36A-E connected to a non-energized winding as discussed above. The back emf signal is a lightly damped sinusoid the amplitude of which is proportional to head velocity. Since the velocity is known to be sinusoidal, the distance from detent at the target track is also inferred from the back emf signal. The window comparator threshold of the ring detector is set to correspond to ±5% off-track, thereby defining the available width of the ring detector output,-RING 39 (FIG. 4).

The ring detector digitizes the output of the selected amplifier 36 during the window period, i.e., when the back emf signal is within the thresholds defined by the window comparator. By separating the outputs of the two amplifiers which are incorporated in the window comparator or ring detector 32, and looking only at the output of one amplifier, the DIRECTION signal 41 is developed which indicates which direction the read/write head is moving as it crosses the target track.

The microprocessor monitors the comparator output, which is shown as -RING 39 during arrival at the target track, and sets the SEEK COMPLETE signal 40, (FIG. 4), true when the back emf signal stays within the window for more than one-half cycle of oscillation. This allows the SEEK COMPLETE 40 signal to be set true as soon as the heads have settled.

The above method monitors the back emf to determine when the seek settle time is ended and SEEK COMPLETE can be sent to the microprocessor. The discussion below will demonstrate use of the back emf information to reduce the stepper settling time.

The back emf of a non-energized coil is always being monitored. If a four-phase-on track is designated as the target track, the back emf monitored 37 is that induced in the non-energized coil which is at a 90° angle to the vector direction of the target track.

In the case where a track is held with five phases energized, a non-energized phase would ordinarily not be readily available for reading the back emf signal. However, it is apparent from inspection of FIG. 2 that a target track reached with five phases energized can also be reached with three phases energized. In the three energized coil cases, one of the two coils at a 72° angle to the vector direction of the target track is monitored to provide the back emf signal. For example, if the system is seeking to track 5, that position is held by deenergizing coils $\overline{D}$ and $\overline{C}$, and sampling the back emf from one of these coils, the same vector position being achieved with $\overline{A}$BE energized. These two coils can later be re-energized to hold the target track.

FIGS. 2 and 4 can be used to illustrate how a torque damping pulse derived from the ring detector output is used to reduce the seek settle time in accordance with this invention. A lookup table accessed on the basis of the duration of the RING pulse 39 determines delay time to and duration of each torque damping pulse $T_D1$, 2, 3 applied to selected coils of the stepper motor which is positioning the transducer.

For example, if the read/write head is targeted to track 4, motor phases $\overline{AB}d\overline{E}$ are energized. If the head has crossed the track as shown at the top line of FIG. 4, a RING pulse 39, $T_P1$ is generated in the ring detector 32. Based on the duration of this pulse and the indicated direction of travel, a torque damping pulse $T_D1$, 42 is generated and applied to a selected phase of the motor. This pulse is termed a forward pulse because it corrects the motor torque to lie in the direction of the original seek. This pulse $T_D1$ is delayed a fixed period 52 with respect to the trailing edge of ring pulse Tp1. The pulse also has a calculated duration to modify motor torque by energizing a selected non-energized phase, e.g., $\overline{C}$, or preferably shutting off an otherwise energized phase, e.g., $\overline{D}$. This provides a position correcting torque on the read/write head toward track 4, thereby properly positioning the read/write head on the target track. If the head moves back across track 4, as shown at the top of FIG. 4, a second ring pulse Tp2 is generated resulting in generation of a torque pulse $T_D2$, 44. This is referred to as a reverse pulse because the change in motor torque is opposite to the effects of the first pulse $T_D1$.

The forward and reverse pulses 42, 44 constitute torque damping pulses, as each pulse $T_D1$, 2, 3 indicates that a phase of the motor normally energized to reach a target track has been shut off at the leading edge of the pulse and turned back on at the trailing edge of the pulse to modify, for that brief period, the existing motor torque. This produces the motor torque necessary to settle the motor on the target track. The width of each pulse $T_D1$, 2 or 3 represents the time that one of the coils normally energized according to the positioning algorithm and phase diagram (FIG. 2) to drive the motor to a particular predefined position at a target track is deenergized. This provides a proper position correcting torque to the motor. Alternatively, a phase of the motor normally deenergized when a particular target track is defined may be energized for the period $T_D1$, $T_D2$ or $T_D3$.

Considering a specific example of seeking from track zero to track 4 (and referring to the phase diagram of FIG. 2 and the timing diagram of FIG. 4), the coils $\overline{ABDE}$ are energized to reach this position, and the back emf 37 is read from coil C, a non-energized coil. In this example, signals RING 39 and DIRECTION 41 indicate that the read/write head has moved too far toward cylinder 5 and a damping torque must be created. For a period of positive torque damping pulse 42, $T_D1$, coil C is turned on. As the motor moves back toward the target track, the coil will be de-energized at the end of that time defined by torque damping pulse $T_D1$. The next pulse on line RING 39, Tp2, indicates that the read/write head which previously overshot cylinder 4 towards cylinder 5 is now moving in the opposite direction and is crossing the target track 4 toward cylinder 3. Since the read/write head has now moved too far toward cylinder 3, coil C is deenergized at about the time of maximum displacement from track 4, creating a damping torque for the period of pulse $T_D2$. This reduces the torque which would drive the motor back past cylinder 4 toward cylinder 5. In this example, a third target track crossing occurs as represented by pulse Tp3. Thus, a third torque damping pulse $T_D3$ is applied, again briefly energizing a normally de-energized coil for a period of the pulse, and settles the read/write head on the track.

As will be apparent from a study of FIG. 4, the damping pulses TD 1, 2, 3 are usually applied at or slightly before a point 50 where the velocity is at a maximum. Thus the points 50 are aligned with the leading edge of the first and second damping pulses $T_D1$, $T_D2$ 41 42.

In a situation such as where the track indicated by the number 5 is the target track, in order to sample the back emf, targeting of this track is done with only three phases energized. The read/write head reaches this track with only phases $\overline{A}BE$ energized; the back emf is read from a non-energized phase. To settle the transducer on the track and damp the ring-out, the forward and/or reverse pulses, phases B or E must be turned on for the period of pulse $T_D1$, $T_D2$ respectively. The force normally applied to reach the track is modified by turning on one coil of the two coils that are not energized to reach the target track.

As the rate of movement of the read/write head across the target track slows down, the width of the window pulse indicated at RING 39 becomes greater. The delay time from the trailing edge of that window to the leading edge of the next succeeding torque damping pulse is correspondingly reduced.

In calculating the lookup table value for the damping pulses the width of the RING pulse must be taken into account in calculating both the duration of torque damping pulse $T_D1$, 2, 42, 44, and the time delay 52 from the trailing edge of the window at ring 39 to the lead edge of the torque damping pulse. Reviewing the example in FIG. 4, the signal RING 39, Tp1 created at the point of maximum displacement of write head past the target track is very narrow, and the delay 52 between the trailing edge of pulse Tp1 and the leading edge of the first torque damping pulse $T_D1$ is fairly significant. In contrast, a transition indicated by the width of pulse Tp3 is much slower, with the read/write head having a reduced velocity such that in passing over the target track barely passes outside the 5% mis-track window, and therefore the delay 54 from the trailing edge of window pulse Tp3 to the leading edge of torque damping pulse $T_D3$ is quite short. As noted above, these delays are defined in the lookup table which is accessed by the microprocessor after it reads the width of the RING pulse Tp1, Tp2 or Tp3.

It is also a known characteristic of the motor to have a certain amount of built-in damping. Once the window pulse RING 39 reaches a certain predetermined width, it is assumed that at the next zero crossing the read/write head will settle on the track because of the inherent damping of the motor.

If the first torque damping pulse does not achieve settling, forward torque damping pulse 42, $T_D1$, is followed by a reverse torque damping pulse 44, $T_D2$, to achieve proper settling. In some cases only a limited number of torque damping pulses 42, 44 are applied. The reason for this and other operating assumptions will be more apparent from the specific example given below.

The following sequence of figures beginning with FIG. 5 represents the development of a set of torque damping pulse times Which can be stored in a lookup table to be accessed on the basis of measurements of the width of the window pulse RING 39 from the ring detector as the read/write head crosses the target track.

Figure 5A:
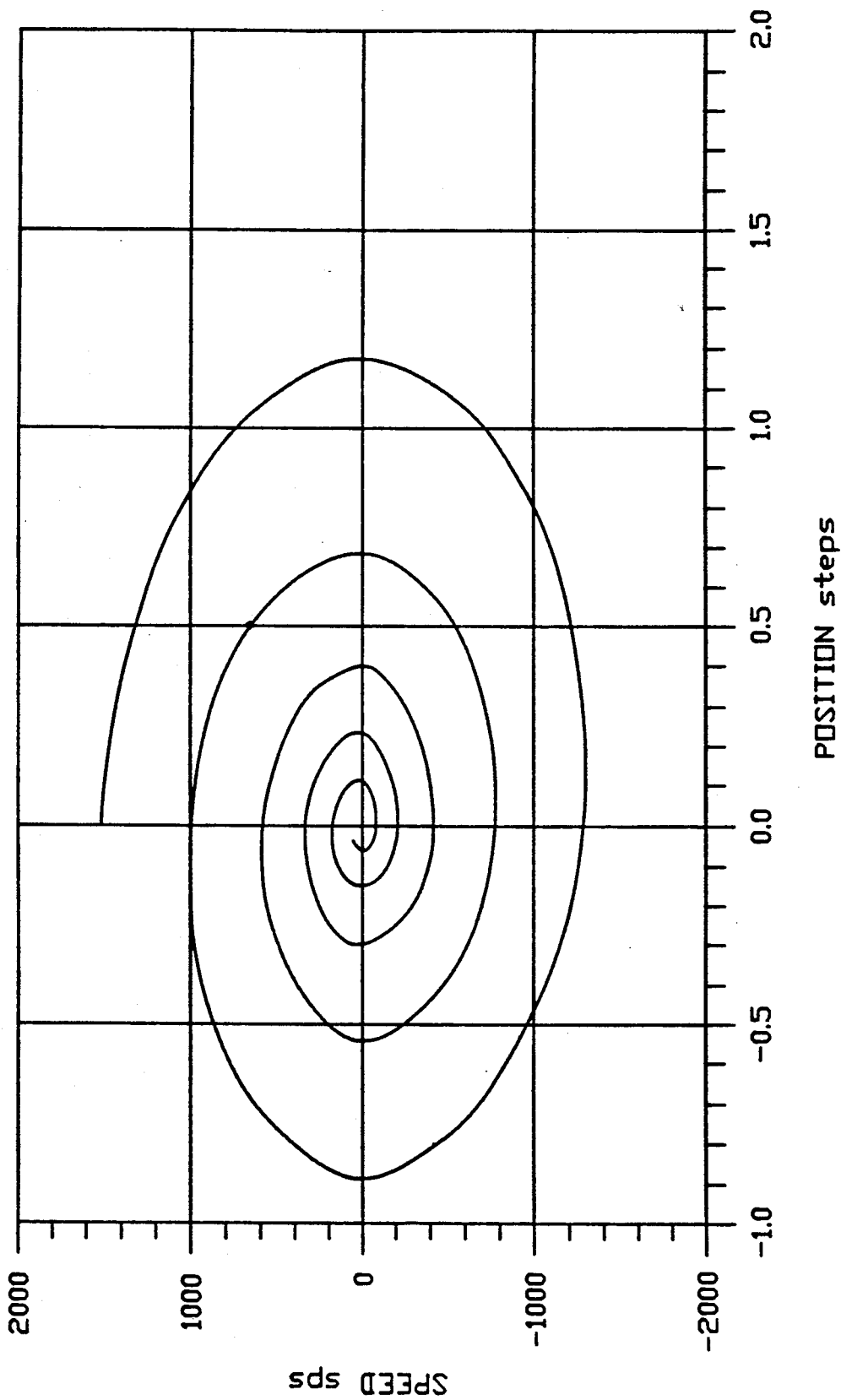
FIGS. 5A, 5B and 5C illustrate in greater detail the positioning of a read/write head over a desired target track and the signals which can be measured to develop the necessary positioning information.
Figure 5B:
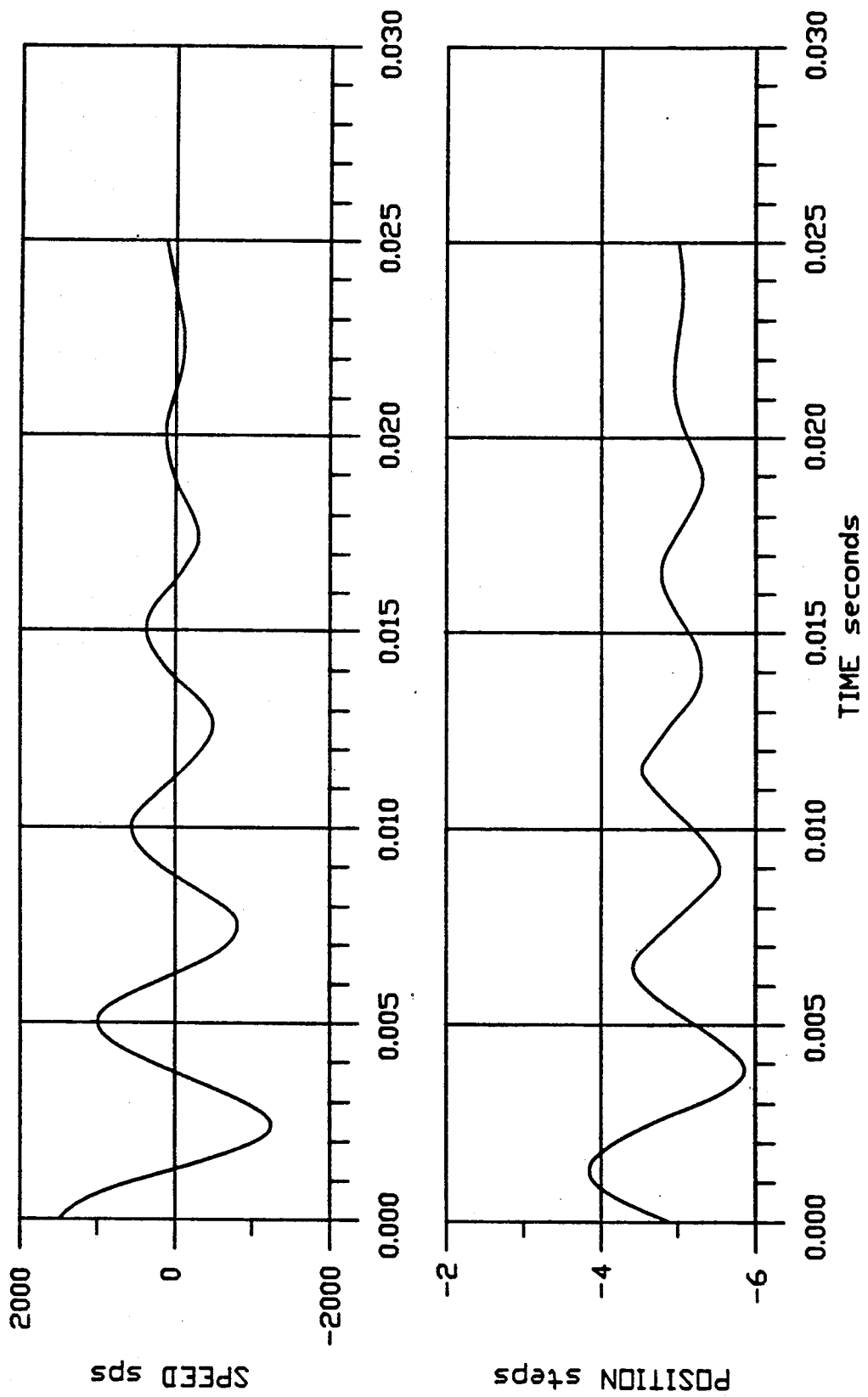
Figure 5C:
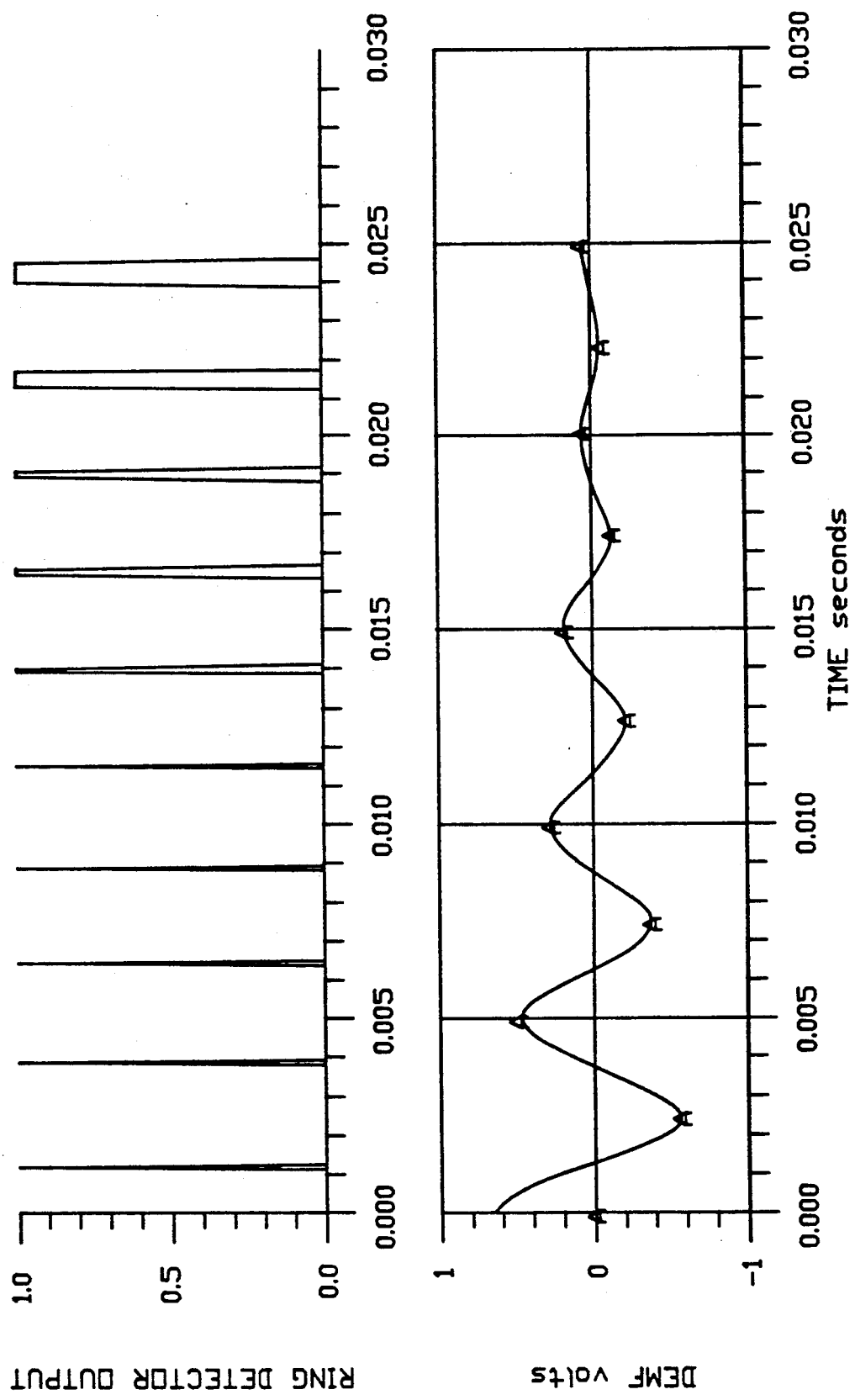

The embodiment above was primarily concerned with generation of a torque damping pulse for a period of time $T_{Dn}$ by energizing an otherwise non-energized phase of the motor. The discussion below relates to a computer generated simulation of a situation wherein, for the period $T_{Dn}$, an otherwise non-energized phase is energized. FIG. 5A is a computer simulation plot of a 10-phase motor showing the velocity vs. position error, with eight phases on; the motor starts from the initial track with an initial velocity of 1500 half steps per second and an initial positional error of zero. FIG. 5B is a plot of motor velocity and position versus time for the same motor. FIG. 5C is a plot of the open circuited phase pair back emf voltage versus time and ring detector output versus time. This is the back emf signal which is monitored at the ring detector to establish position and positioning error as explained above. The back emf voltage shown in the lower plot in FIG. 5C is gradually damped down to zero as the transducer settles on the target track. The upper plot in FIG. 5C, which is the ring detector output demonstrates how the pulse width is very narrow at the ring detector output when the target track crossings are rapid, the width widening as the read/write head settles onto the target track.

Figure 6A:
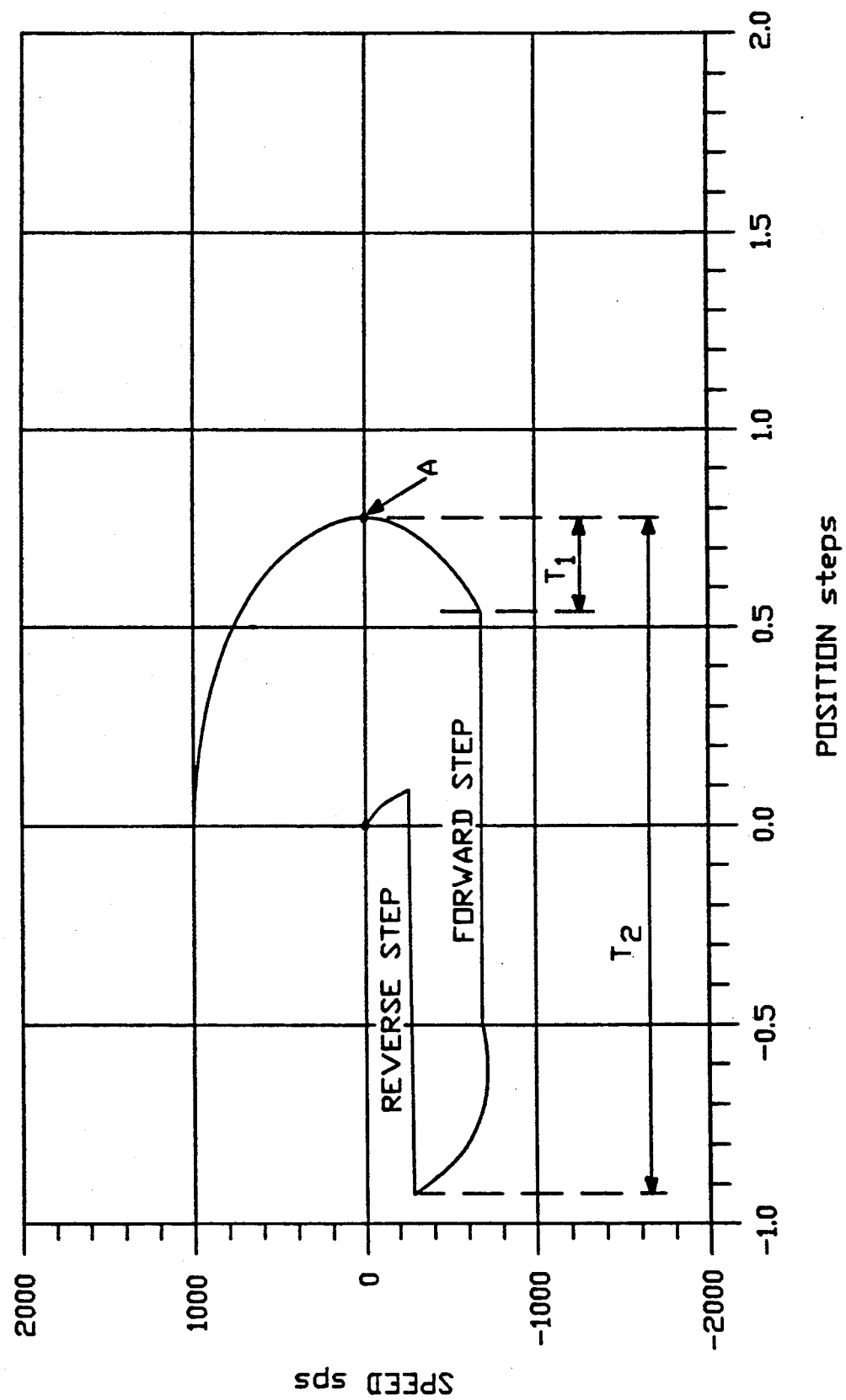
FIGS. 6A, B, C illustrate the application of the last two torque damping pulses which are applied in response to the ring detector output to finally position the read/write head at the target track or track zero.
Figure 6B:
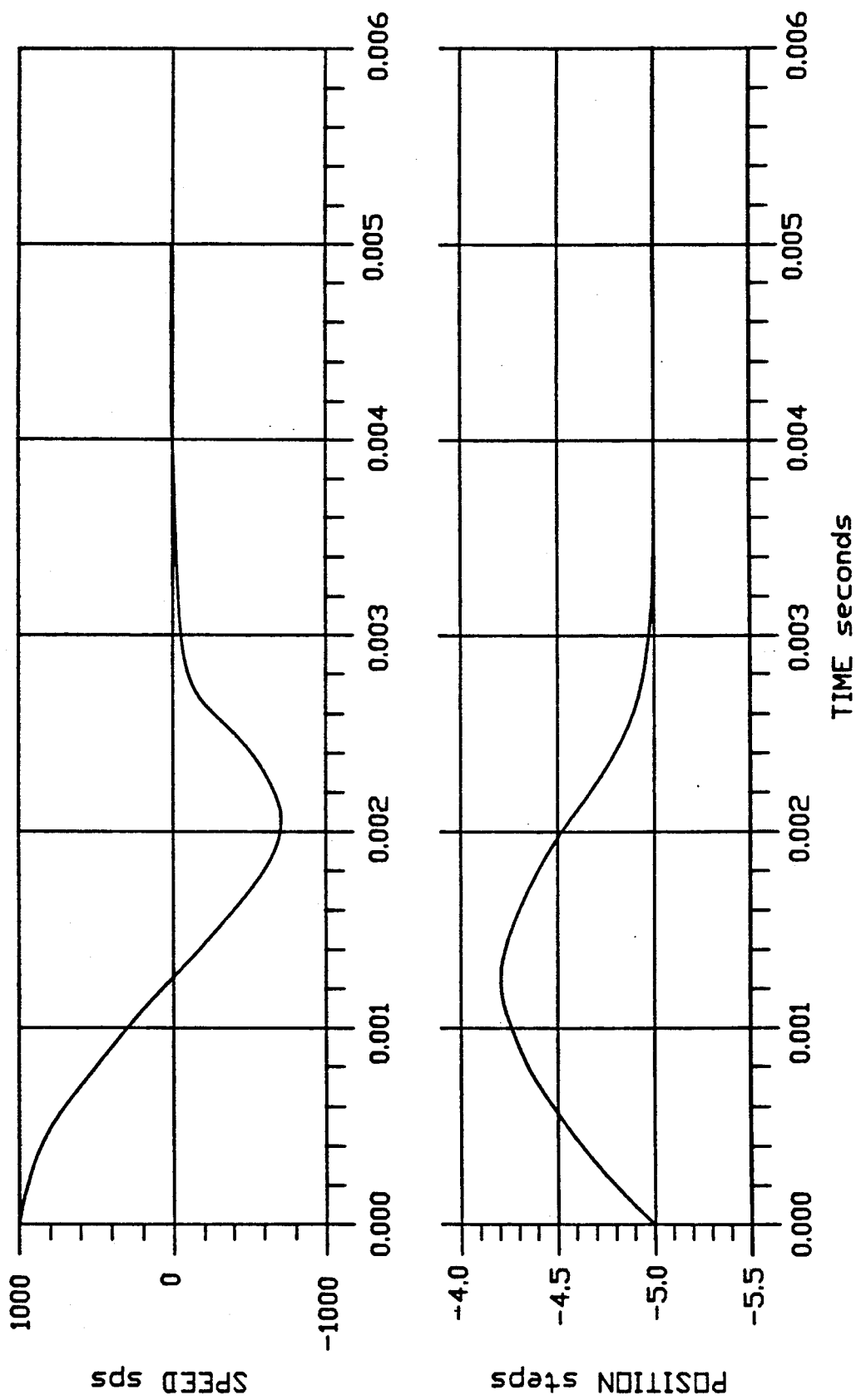
Figure 6C:
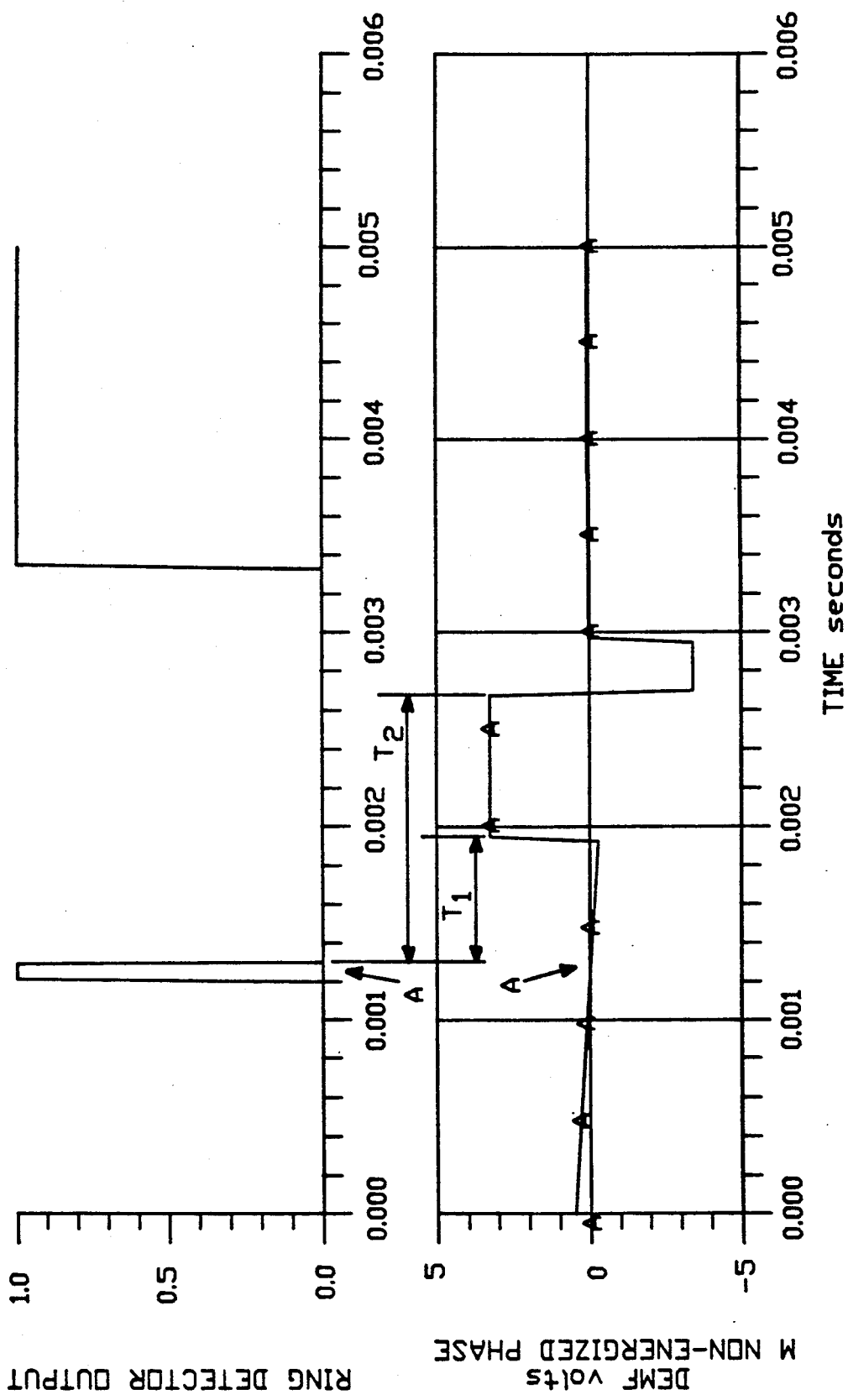

FIG. 6A is a phase plane for a sample disc drive showing speed vs. position error. This study assumed that the initial target track crossing is going from positive velocity to negative velocity; the opposite could also be true as under the preferred embodiment discussed above the direction output of the ring detector conveys a signal indicating the direction of track crossing. FIG. 6C illustrates at point A the first zero velocity crossing which is used to infer the velocity at the time of the first crossing of the target track by the transducer; it is located by monitoring the back emf of a non-energized phase. Since the target track crossing is rapid, a corresponding narrow ring detector output ensues. By measuring the width of the ring detector output, delays T1 and T2 to the beginning and end of the torque damping pulse to be applied to the selected phase of the motor can be established. It should be noted from FIG. 6C that the pulse width shown in the upper figure is directly dependent on the slope of the zero velocity crossing defined by the back emf signal.

Figure 7:
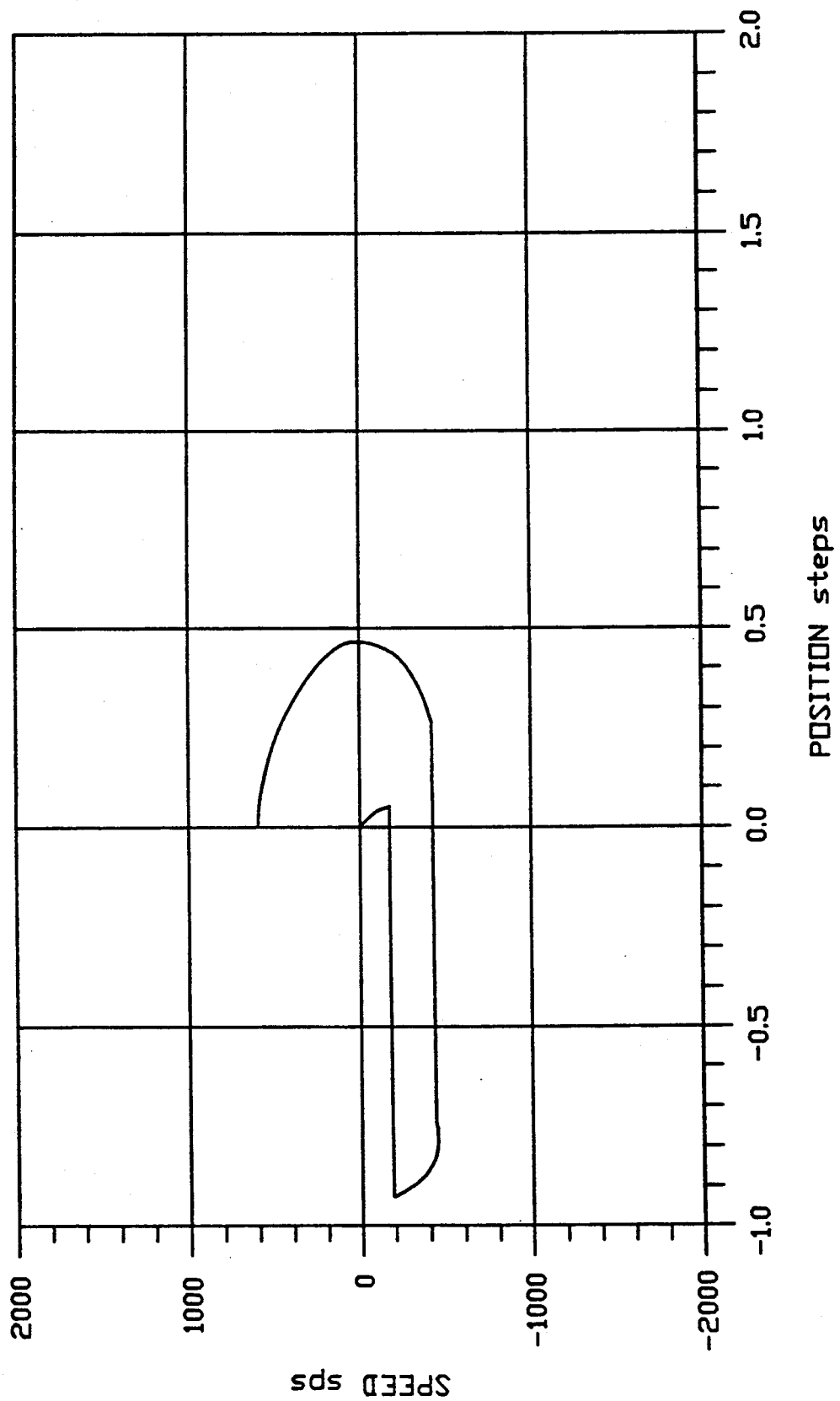
FIGS. 7 through 12 illustrate various positioning sequences used to develop the final two positioning pulses and position the read/write head over the target track.
Figure 8:
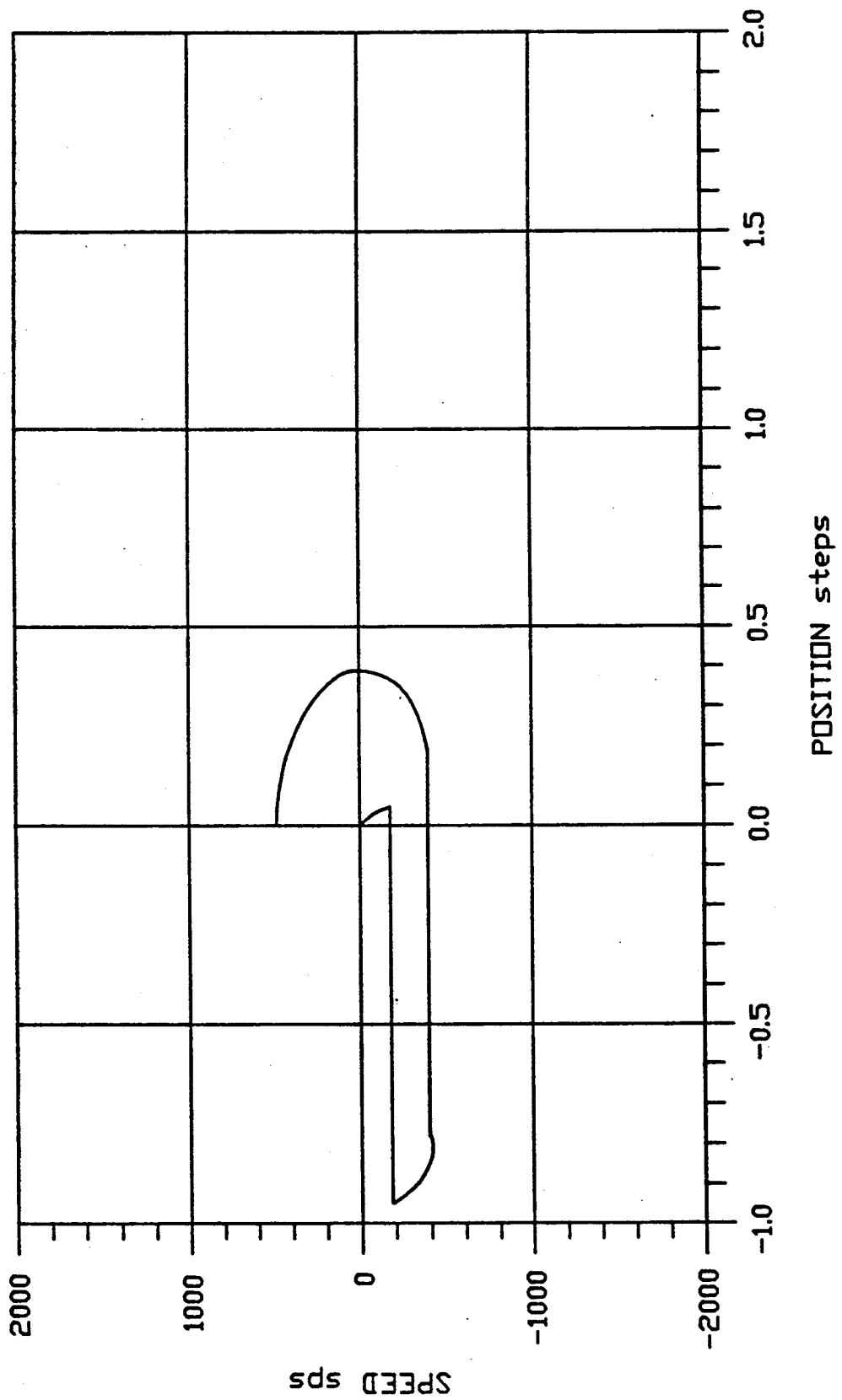
Figure 9:
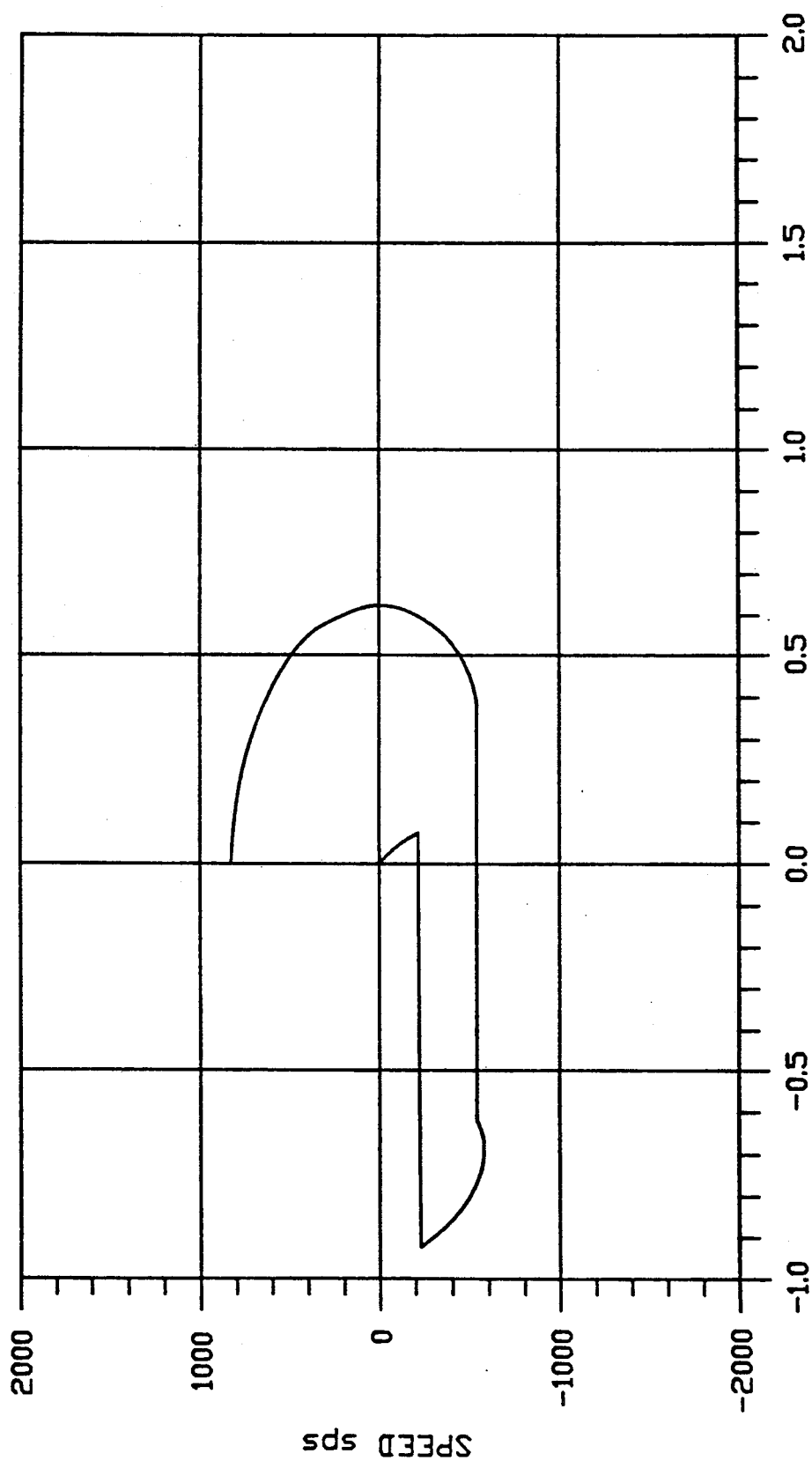
Figure 10:
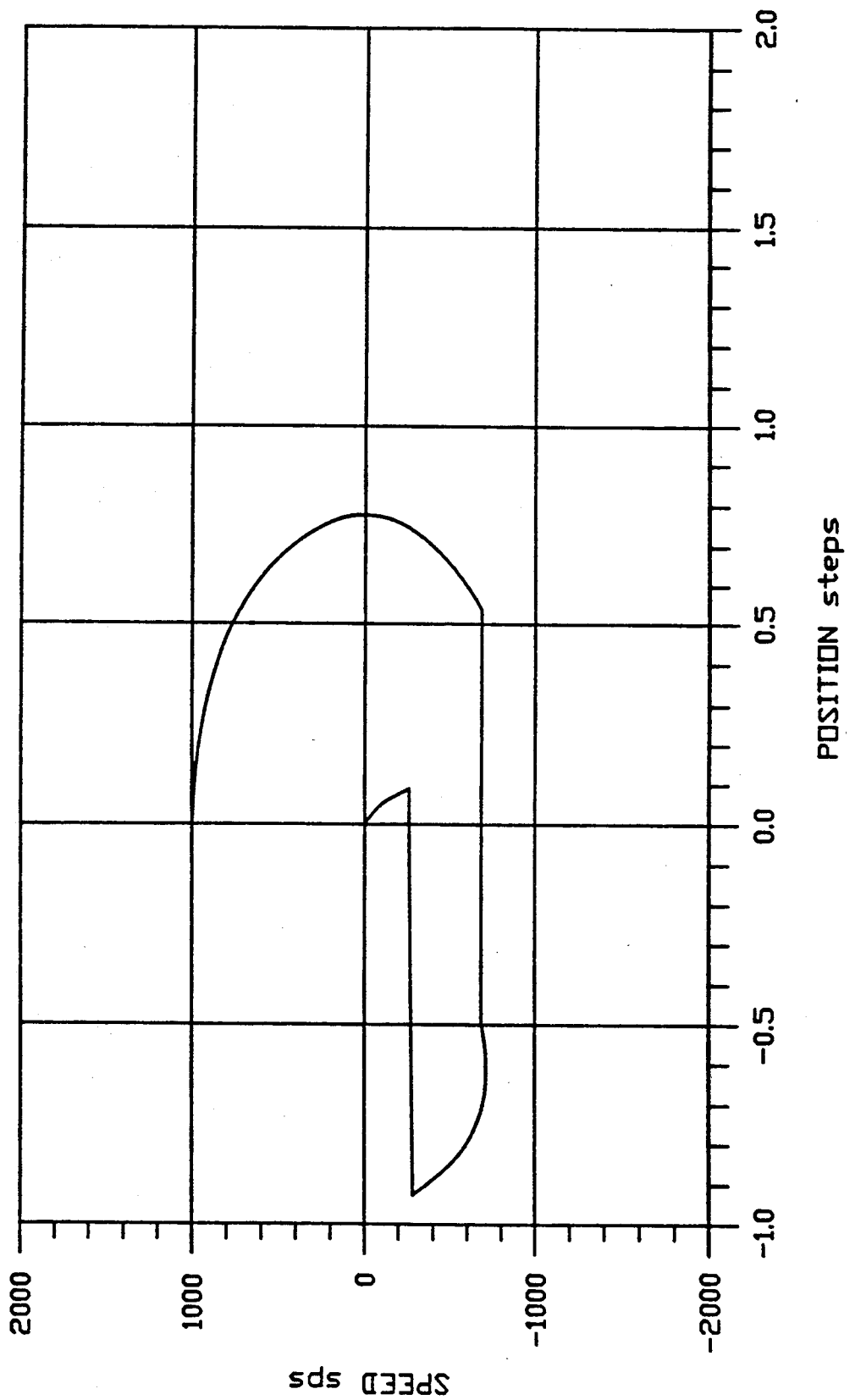
Figure 11:
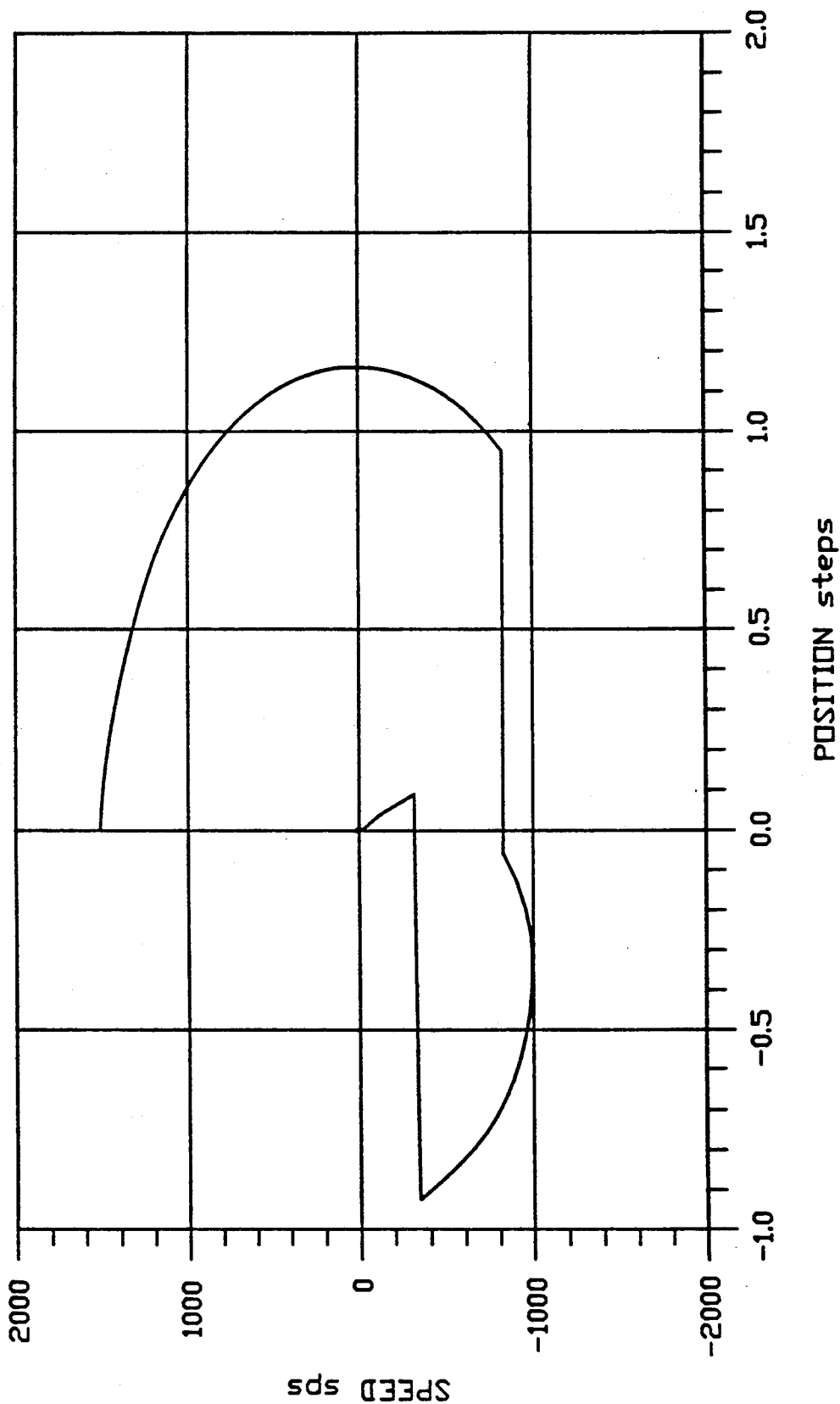
Figure 12:
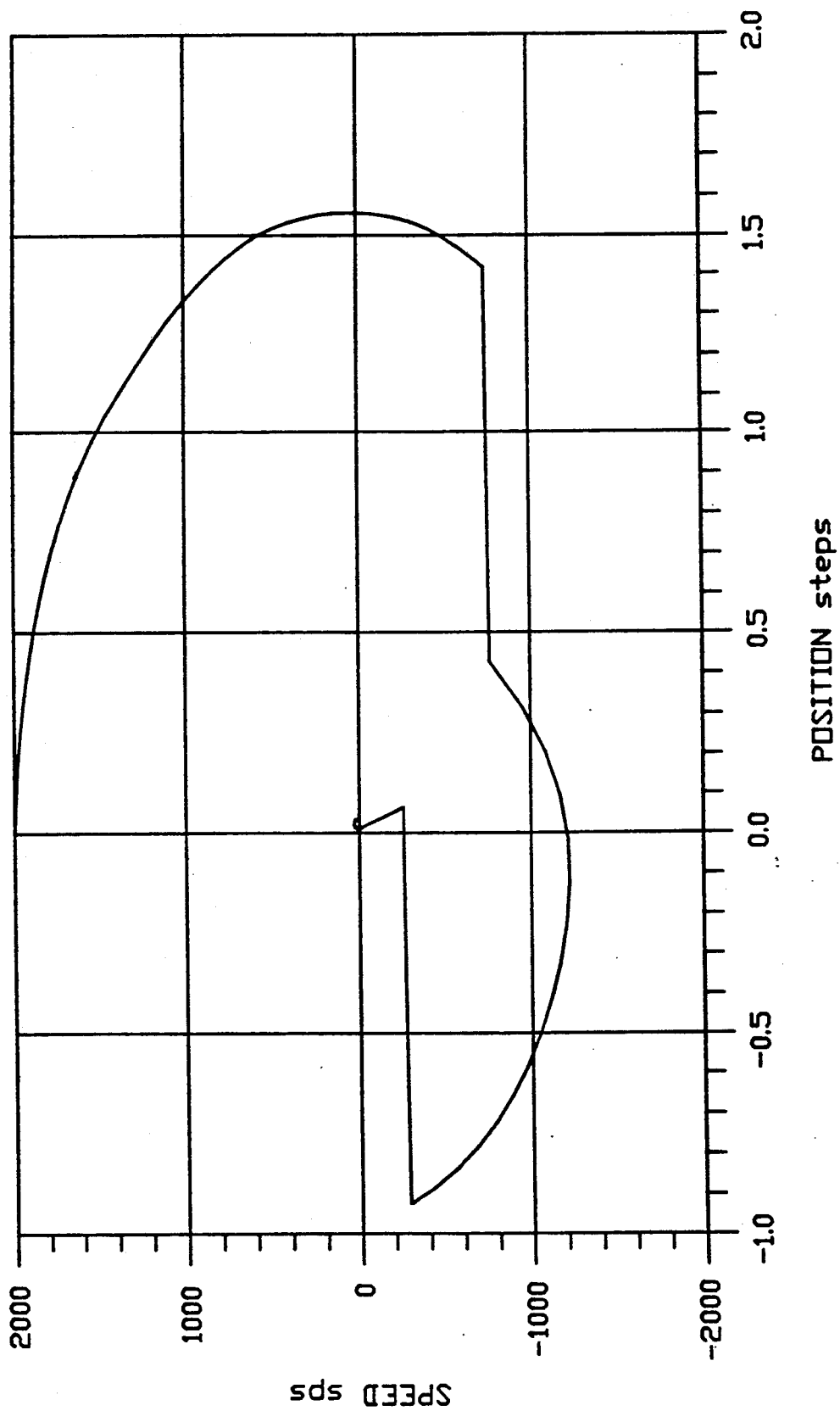
Figure 13:
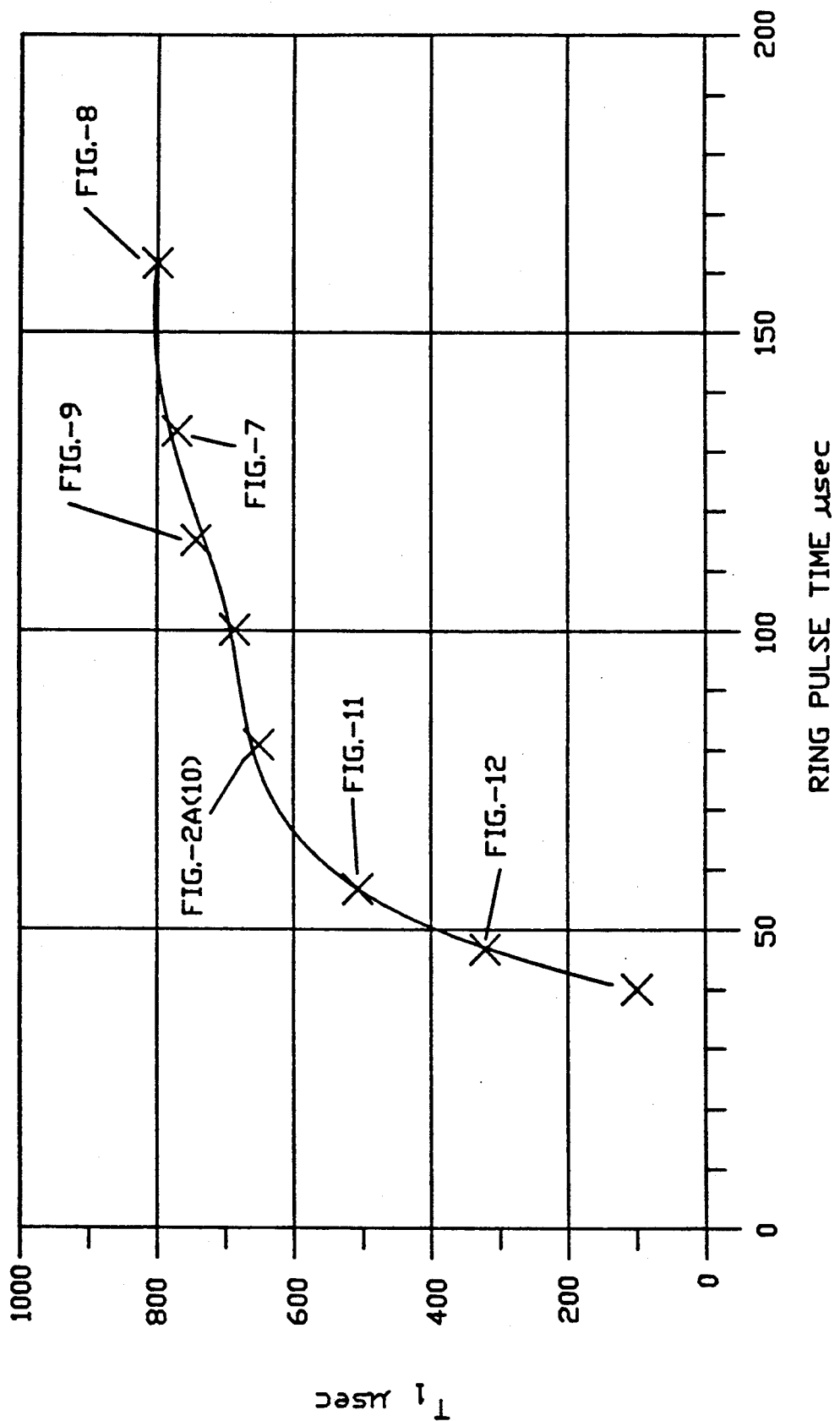
FIG. 13 illustrates a curve fitted to data generated from FIGS. 6–12 to develop step pulse command time period T1.
Figure 14:
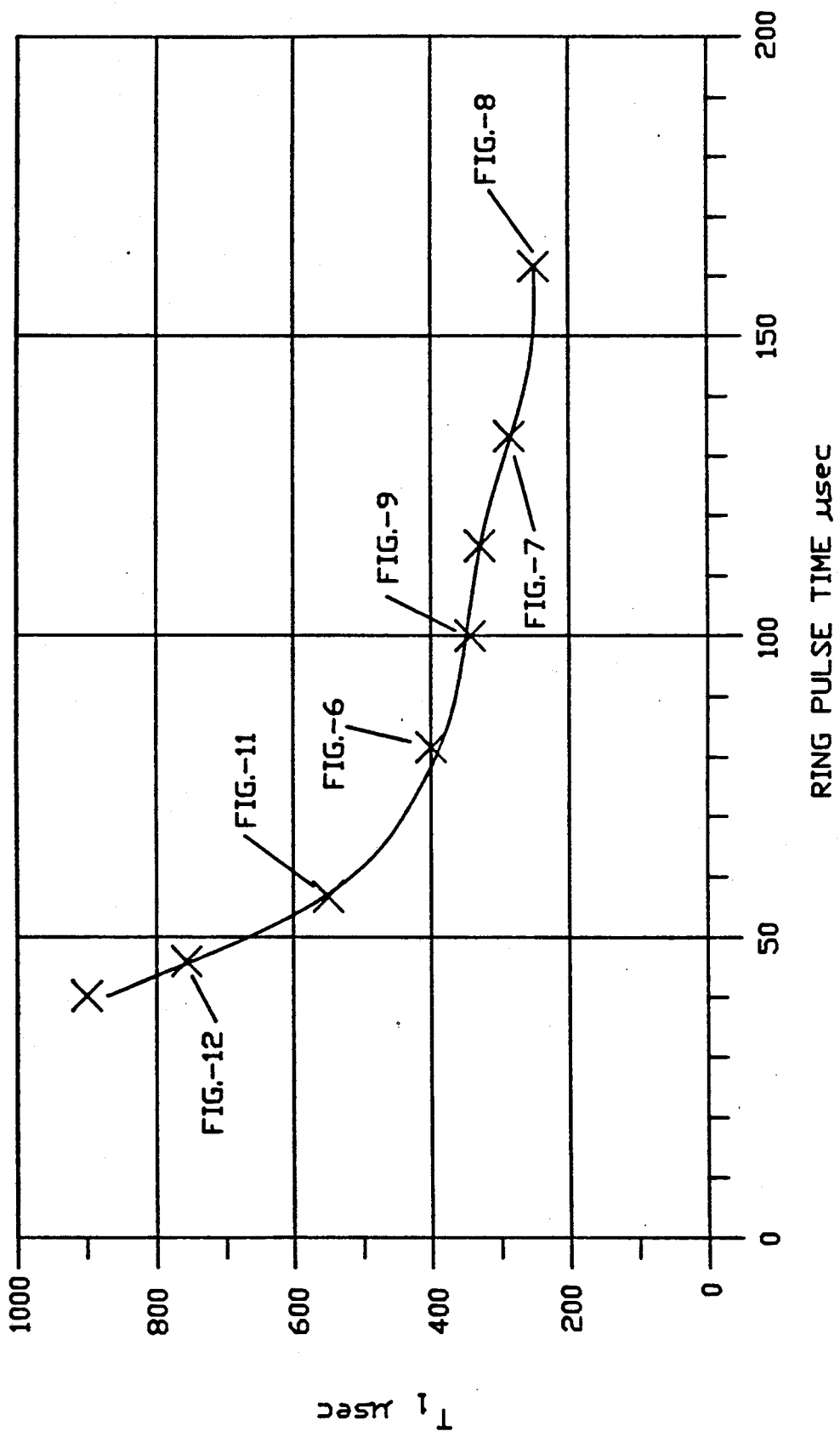
FIG. 14 illustrates a curve fitted to data generated from these same figures to generate step pulse command time period T2.
Figure 15:
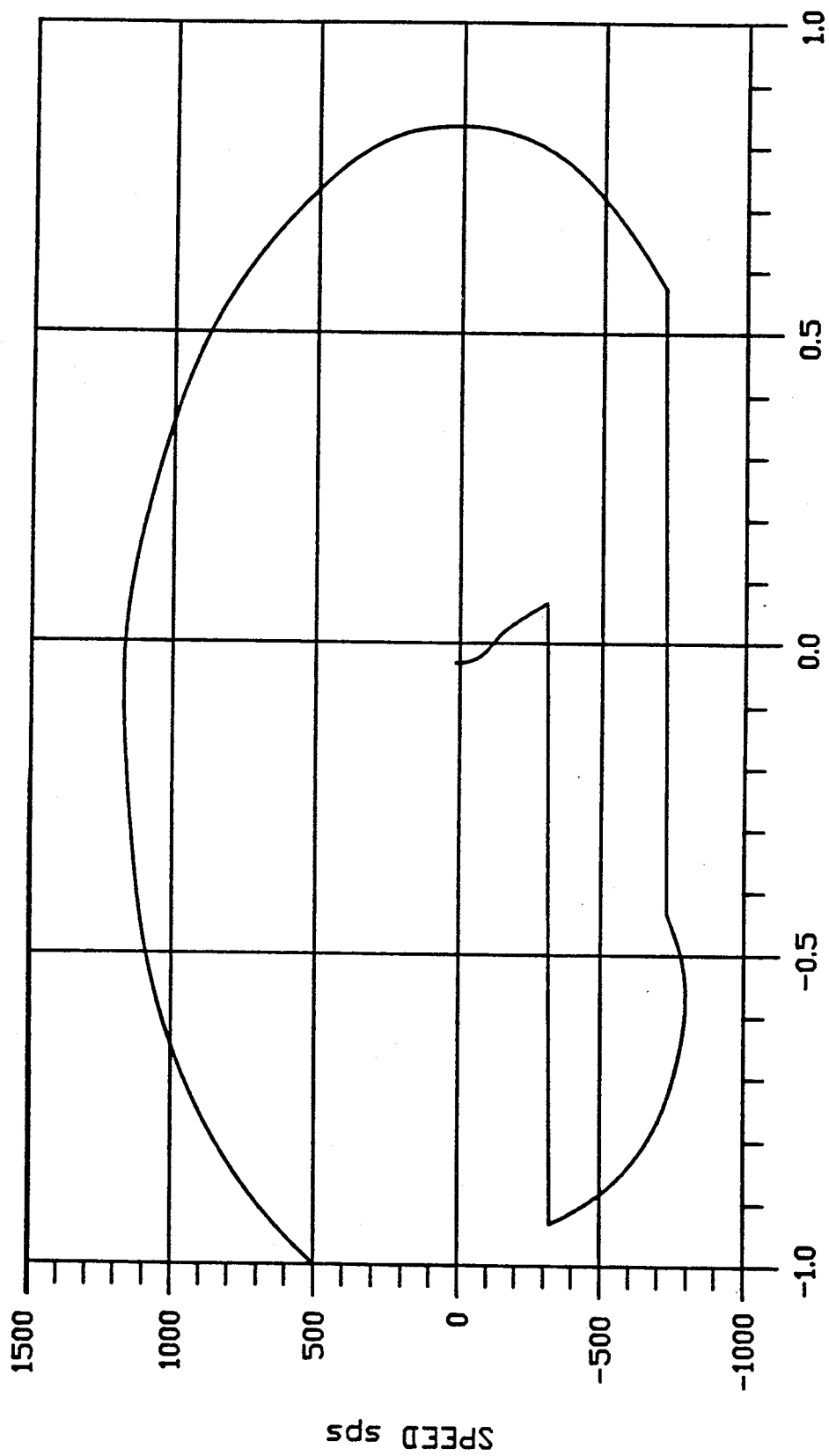
FIGS. 15-19 indicate potential system responses using the control sequence developed for this invention.
Figure 16:
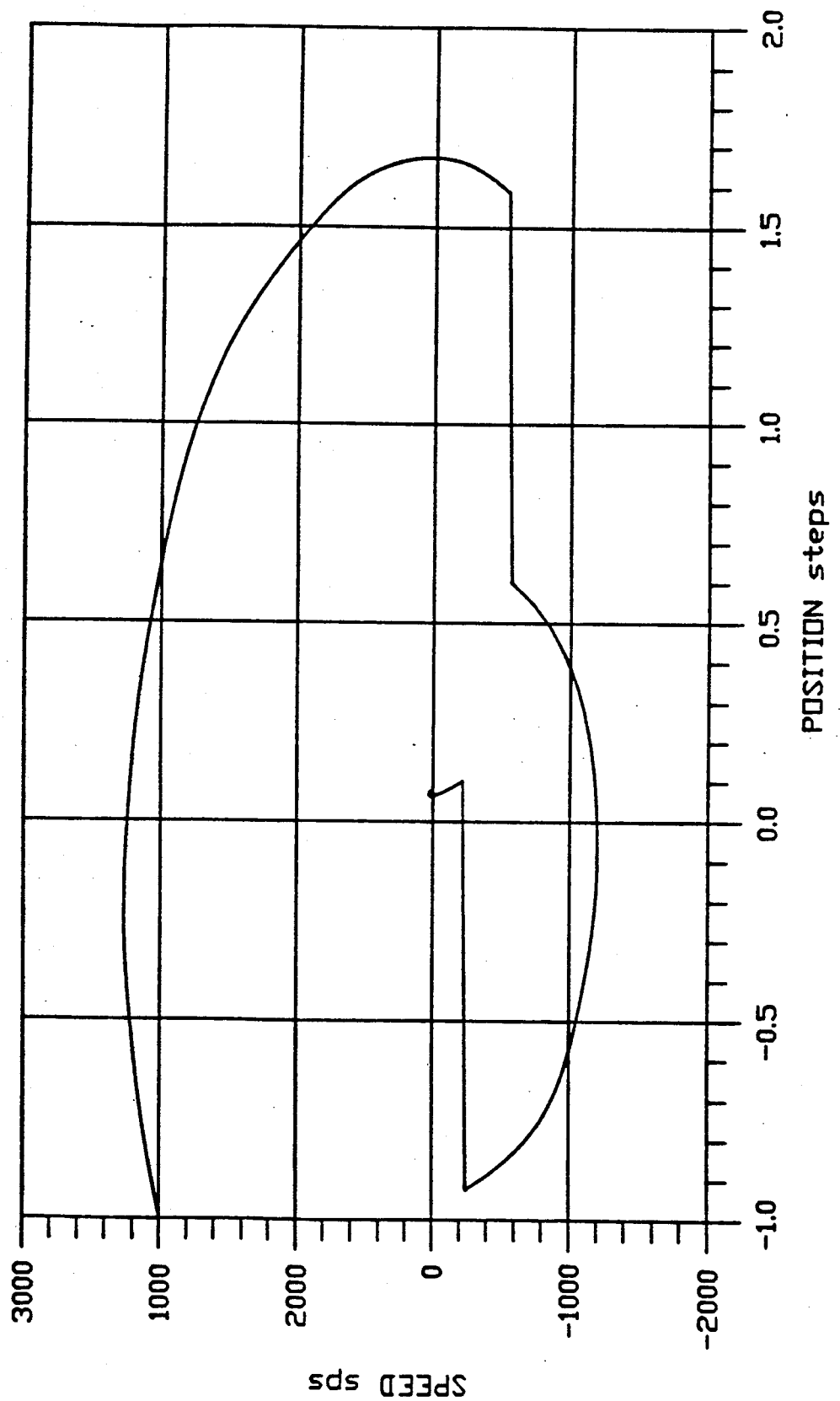
Figure 17:
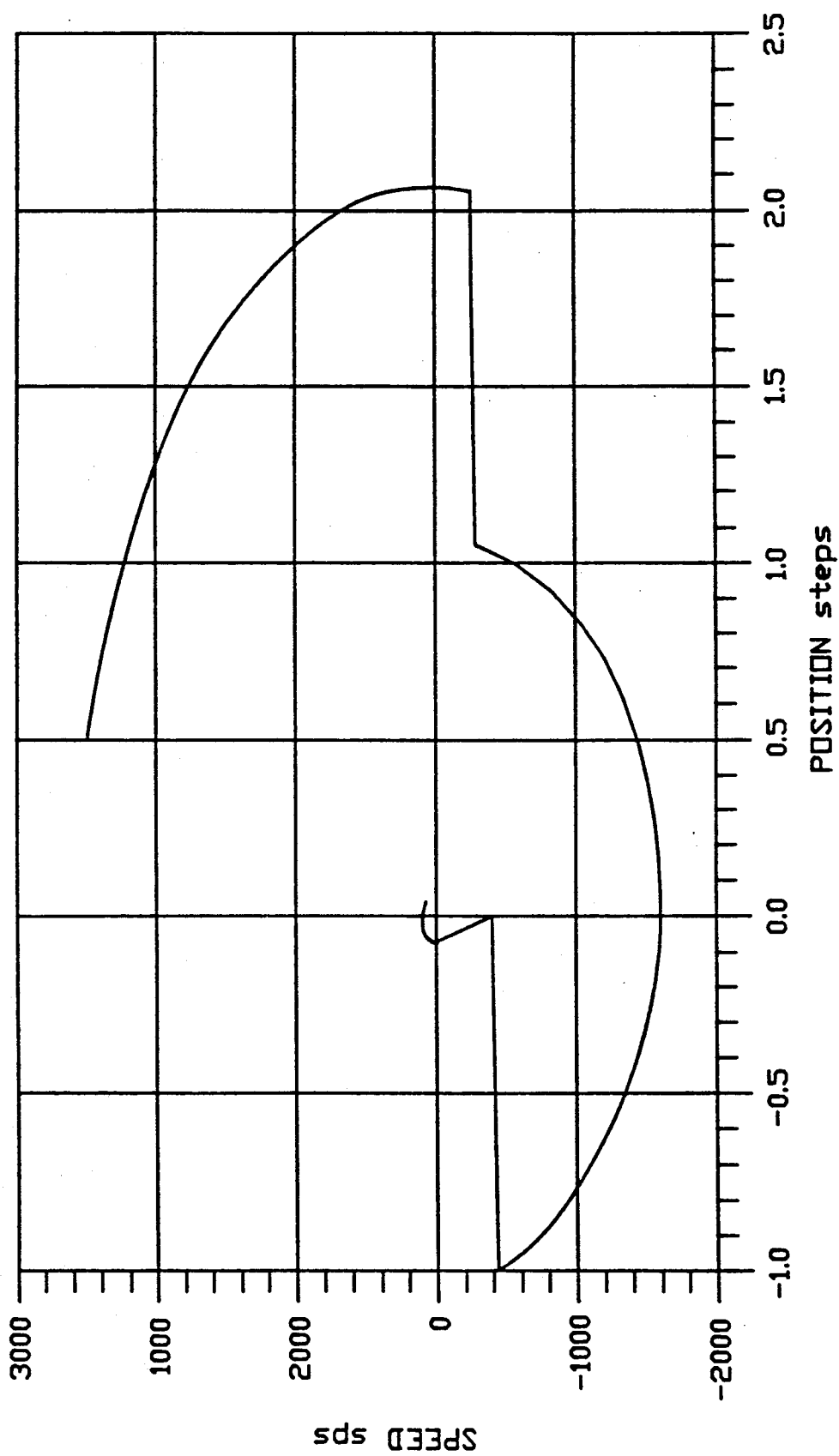
Figure 18:
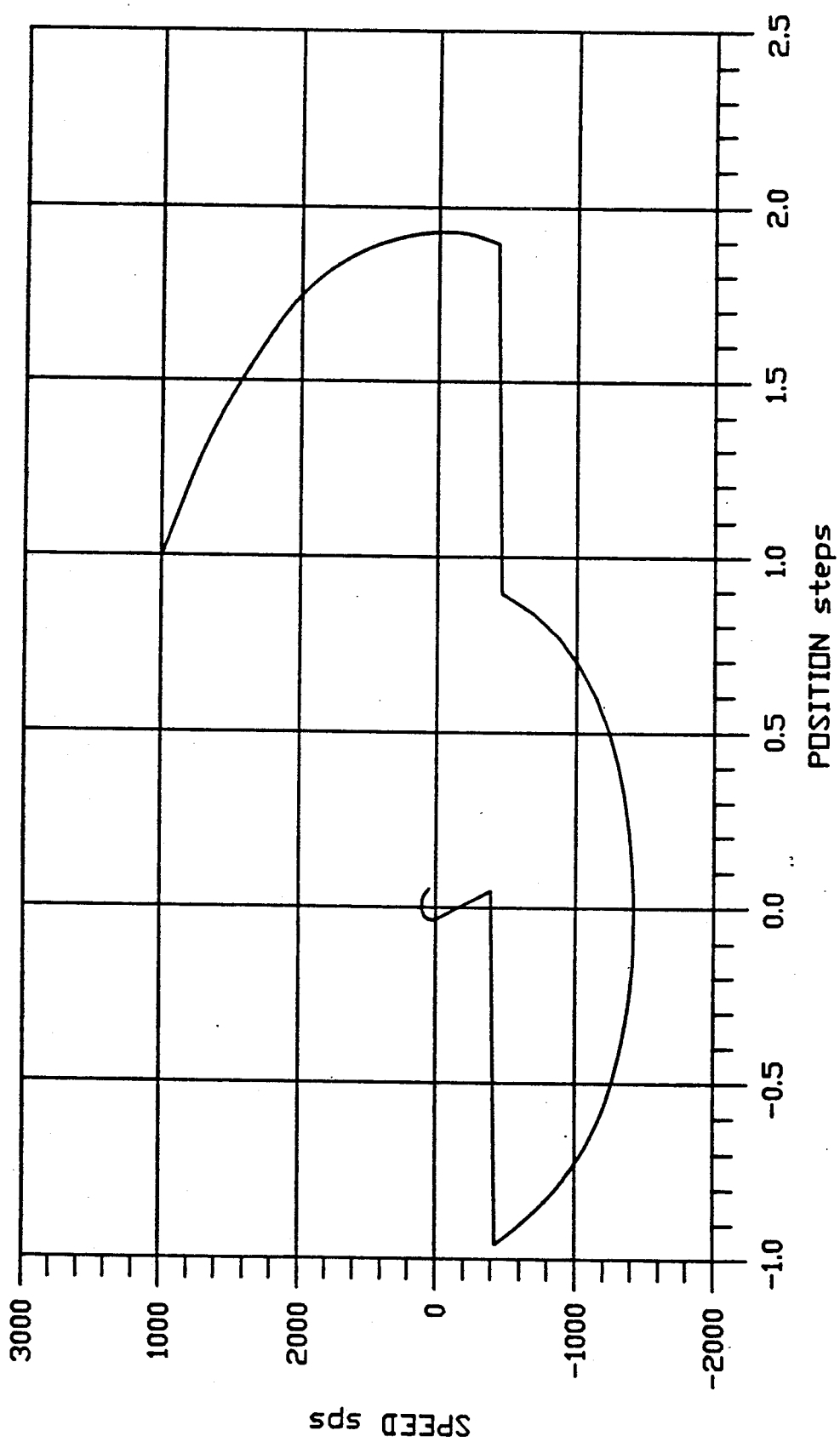
Figure 19:
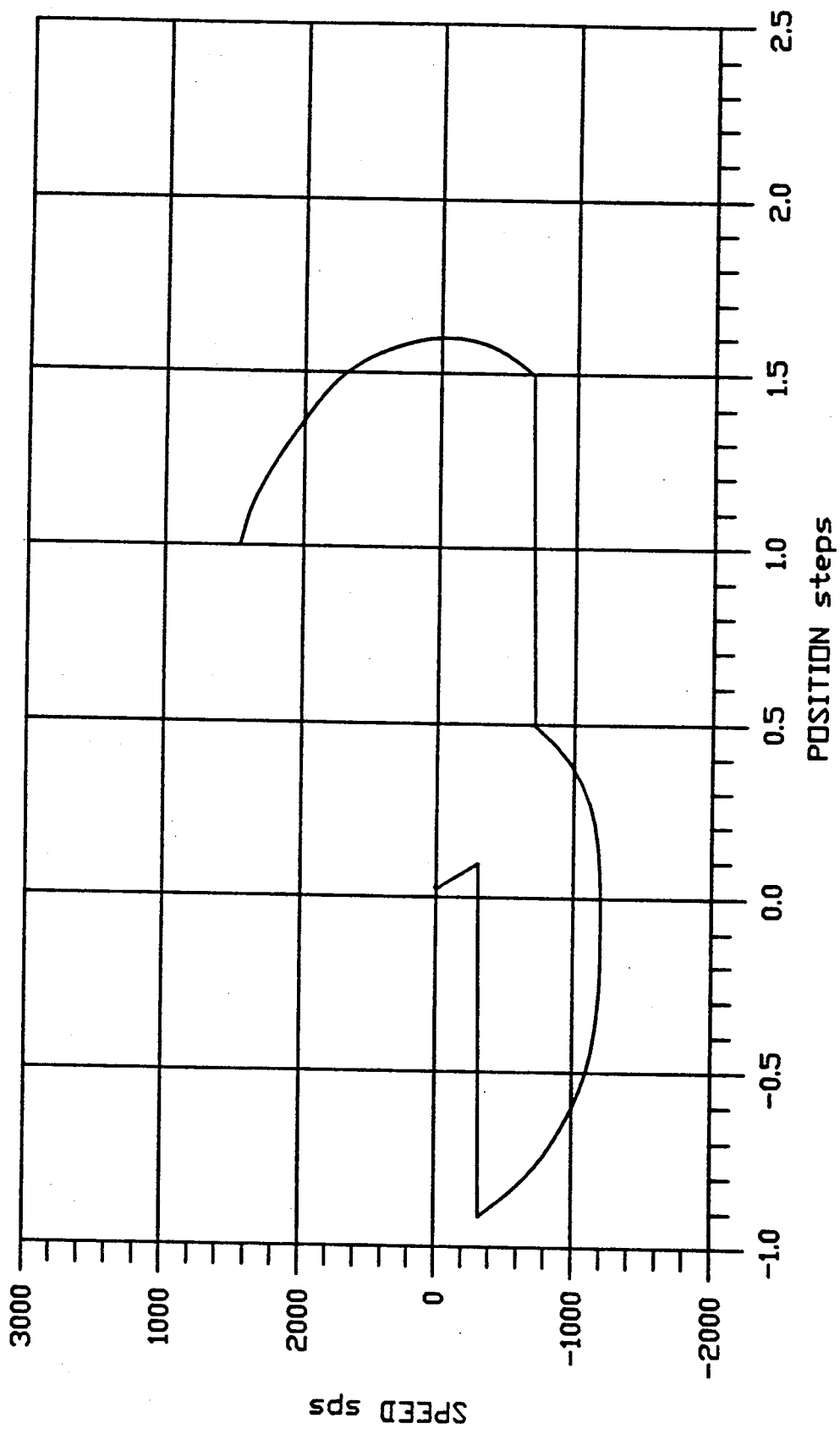

FIGS. 13 and 14 illustrate the calculation of the times T1 and T2. It is known that, as discussed above, the ring pulse time or width of the detector window pulse output (RING 39, FIG. 4) is directly relatable to the amount of energy in the system at the zero velocity crossing which relates directly to position error. To define this relationship in a manner which can be consistently implemented, the initial velocity of the system was varied as shown in FIGS. 7-12, providing a series of points that could be plotted in FIGS. 13 and 14 as time T1 or T2 in microseconds vs. the ring pulse time. For any initial velocity, as represented by the ring detector output, two time periods, one the period $T_1$ to the application of the damping pulse and the second $T_2-T_1$ representing the duration of the damping pulse, were found to minimize the ring out. These two step times were found for various initial velocities as in FIGS. 7-12 and plotted vs. ring pulse time for each solution. Thus, the forward step time T1 (time from the zero velocity crossing to the positive step command) can be plotted vs. ring pulse time as shown in FIG. 13. A similar plot can be made for the time T2 which is the time from the zero velocity crossing to the end of the torque pulse command as shown in FIG. 14. From this data a polynomial using least square's methods can be fitted through the data points. Given this energy function, the ring pulse time can be measured as the step motor crosses the zero velocity axis, and the time periods T1 and T2 can be either calculated by an algorithm or selected from the above lookup table and applied to a desired phase of the motor to create the necessary damping torque and minimize the ring out time. By storing sets of points selected for each ring pulse time width, delay times and durations for appropriate forward and reverse step damping commands can be selected. The appropriate pulse of the motor to be affected by the command can be easily derived on the basis of the polar diagram of FIG. 2. By a combination of these commands applied to the appropriate phase of the motor, a landing with zero position error with very rapid settling times can be consistently achieved. As noted above, the curves of FIGS. 13 and 14 were generated from the conditions mapped in FIGS. 7-12. FIG. 7, for example, shows an initial condition of a velocity of 600 steps a second; the two times T1 and T2 that result are 770 microseconds and 1285 microseconds. After the curves shown in FIGS. 13 and 14 have been developed the initial velocity and initial position of the system were varied to observe the system response, resulting in the curve shown in FIGS. 15-19. Each of FIGS. 15-19 shows a different initial speed and initial off-track error ranging from 500 to 2500 steps per second and an off-track error ranging from −1 step to +1 step.

While in this example a single pair of time periods are shown, each generated in response to a separate ring pulse $T_{P1}$ is used, in many cases two pulses $T_{D1}$ and $T_{D2}$ are used. The use of a pair of pulses 42, 44 is the most common and efficient case for settling the motor at the target track. Beyond the use of two pairs, limited efficiency is achieved in the reduction of ring-out time.

Other alternatives to this invention may become apparent of person of skill in the art who studies this disclosure. Therefore, the scope of this invention is to be limited only by the following claims.

What is claimed:

1. A system for positioning a read/write transducer relative to a magnetic storage disc carrying a plurality of concentric tracks to read and write data stored on the disc, said positioning system comprising motor means having a plurality of phases selectively energizable for moving the read/write transducer to a preselected recording position over a target track selected from said plurality of said tracks on said disc, drive means for providing relative movement between said disc and the read/write transducer thereby enabling the transfer of data between said disc and the read/write transducer, drive computer control means for sending a sequence of step pulses to said motor means to drive said transducer from track to track, ring detector means for sensing that said transducer is passing over said target track and for generating an output signal indicating said passage, said drive computer control means responsive to said ring detector output signal for selectively controlling a damping pulse applied to a selected phase of said motor means to position said transducer over the target track.

2. A positioning system as in claim 1 wherein said target track is reached by energizing selected ones of said phases, said ring detector momentarily reading the back emf signal of one of the phases which is not energized to reach said target track in which maximum back emf is induced.

3. A positioning system as in claim 2 wherein an odd number of said phases of said motor are energized to reach the target track, said positioning system including means for momentarily deenergizing two of said odd number of phases, as said transducer passes over said target track, said ring detector being selectively connected to one of said two momentarily deenergized phases to detect a maximum back emf signal.

4. A positioning system as in claim 2 wherein said ring detector includes means for setting voltage thresholds corresponding to a specified off-track margin, the width of said ring detector output signal being a function of the time said transducer traverses between said voltage thresholds to thereby represent the velocity of the transducer at the target track.

5. A positioning system as in claim 4 wherein said ring detector includes means for indicating the direction said transducer is travelling as it traverses the target track.

6. A positioning system as in claim 4 wherein said drive computer control is responsive to said ring detector output to modify the timing of the application of said damping pulse relative to the time of said target track crossing to minimize the ring-out time for said motor.

7. A positioning system as in claim 6 wherein said ring detector includes means for indicating the direction said transducer is travelling as it traverses the target track.

8. A positioning system as in claim 6 wherein said back emf signal is a sinusoid, the system setting a SEEK COMPLETE signal when the back EMF stays within the said voltage thresholds for more than one-half cycle.

9. A positioning system as in claim 8 wherein said ring detector is selectively connected to one of the phases which is not energized to reach said target track in which maximum back emf is induced.

10. A positioning system as in claim 9 wherein the energized phases comprise an even number of said phases, the phase selectively connected to the ring detector being at an angle of 90 degrees to a vector direction representation of the target track location.

11. A positioning system as in claim 9 wherein the energized phases comprise an odd number of said phases, the phase selectively connected to the ring detector being at an angle of 72 degrees to a vector direction representation of the target track location.

12. A positioning system as in claim 6 wherein said drive computer control means includes a lookup table means for storing the delay times from said ring detector output signal to said damping pulse, said lookup table being accessed on the basis of the width of said ring detector output signal.

13. A positioning system as in claim 12 wherein said drive computer control means is responsive to the information in said lookup table to turn off or on a selected phase of said motor for the duration of the damping pulse, whereby the motor torque is modified to settle the motor on target track.

14. A positioning system as in claim 13 wherein said lookup table further includes, in addition to the delay times to said damping pulse, information defining the width of said damping pulse to define the time period that said selected windings are deenergized.

15. A positioning system as in claim 14 wherein said drive computer control means includes means for carrying out said sequence for selectively controlling a final damping pulse before setting a SEEK COMPLETE signal is carried out twice.

16. A positioning system as in claim 14 wherein the leading edge of said damping pulse is aligned with the point of maximum displacement of said transducer from said target track as defined by said back emf signal.

* * * * *